United States Patent [19]
Watanabe et al.

[11] Patent Number: 5,090,003
[45] Date of Patent: Feb. 18, 1992

[54] METHOD AND APPARATUS FOR ADJUSTING TARGET POSITION OF FOCUSING OF LIGHT BEAM

[75] Inventors: Katsuya Watanabe, Osaka; Mitsuro Moriya, Neyagawa; Shinichi Yamada, Hirakata; Masayuki Shibano, Izumisano, all of Japan

[73] Assignee: Matsushita Electric Industrial Co., Ltd., Osaka, Japan

[21] Appl. No.: 391,111

[22] Filed: Aug. 9, 1989

[30] Foreign Application Priority Data

| Aug. 9, 1988 | [JP] | Japan | 63-198253 |
| Aug. 31, 1988 | [JP] | Japan | 63-216510 |
| Sep. 30, 1988 | [JP] | Japan | 63-248124 |
| Mar. 17, 1989 | [JP] | Japan | 1-67068 |

[51] Int. Cl.$^5$ ............................................. G11B 7/00
[52] U.S. Cl. ............................................. 369/44.34
[58] Field of Search ............ 369/32, 44.11, 44.32, 369/44.33, 44.34, 44.35, 44.37, 44.41, 54, 58, 124; 360/77.01, 77.04, 77.06; 318/636

[56] References Cited

U.S. PATENT DOCUMENTS

| 4,692,915 | 9/1987 | Moriya | 369/53 |
| 4,707,648 | 11/1987 | Minami | 369/44.35 |
| 4,878,135 | 10/1989 | Makino | 360/77.04 |

FOREIGN PATENT DOCUMENTS

| 54-116902 | 9/1979 | Japan . | |
| 57-30126 | 2/1982 | Japan . | |
| 0083339 | 5/1983 | Japan | 369/44.32 |
| 60-32133 | 2/1985 | Japan . | |
| 61-59629 | 3/1986 | Japan . | |
| 61-14575 | 4/1986 | Japan . | |

*Primary Examiner*—Robert L. Richardson
*Attorney, Agent, or Firm*—Wenderoth, Lind & Ponack

[57] ABSTRACT

In an apparatus which focuses a light beam on a rotating recording medium in order to record and/or reproduce information, the light beam on the recording medium is focus controlled so that a prescribed focusing condition is accomplished. By storing a relation between a target position of focus control and the amplitude of a reproduced signal and by obtaining an optimum target position of focus control is accordance with such stored information, the target position of the focus control can be precisely and quickly adjusted, thereby properly controlling the light beam to be focused on the recording medium.

17 Claims, 17 Drawing Sheets

METHOD AND APPARATUS FOR ADJUSTING TARGET POSITION OF FOCUSING OF LIGHT BEAM

BACKGROUND OF THE INVENTION

1. Field of the Invention

The invention relates to an optical recording and reproducing apparatus for optically recording signals on a recording medium and for reproducing the recorded signals using a light source such as a laser, and more particularly to a method and an apparatus for adjusting a target position for focus control so that the focusing condition of a light beam irradiated on the recording medium is made to conform to a prescribed focusing condition.

2. Description of the Prior Art

As a conventional apparatus, there is an optical recording and reproducing apparatus which focuses a light beam generated by a light source such as a semiconductor laser on a disk-like recording medium that is rotating at a prescribed rotational frequency, to record signals on the recording medium or reproduce the recorded signals. On the recording medium is provided a minute track of 0.6 $\mu$m width and 1.5 $\mu$m pitch, spirally or concentrically. In order to record signals on the track or to reproduce the signals recorded on the track, the light beam irradiated on the recording medium is focus controlled so that the light beam satisfies a prescribed focusing condition.

A focus control system of the apparatus consists of a light detector which detects out-of-focus signals corresponding to the focusing conditions of the light beam on the recording medium by the light reflected from the recording medium or the light transmitted through the recording medium, and an actuator which moves a focusing lens for focusing the light beam on the recording medium in a direction almost vertical to the recording medium, and a control circuit which drives the actuator according to the out-of-focus signals detected by the light detector so that the light beam on the recording medium is controlled to focus in the prescribed focusing condition. In order for the light beam on the recording medium to be focus controlled so as to conform to the prescribed focusing condition, it is necessary to adjust the target position of the focus control.

The target position of the focus control system (hereafter called the target position) is conventionally adjusted so that the amplitude of the reproduced signal for adjustment recorded in advance on the recording medium is maximized, as stated in the laid open Japanese patent No. 61-14575/1986.

The method of adjustment will be further described in detail. When the recording medium is caused to rotate and the focus control is operated, the adjustment signal previously recorded is reproduced, the reproduced signal is envelope detected and held at peak, and the light detector is actuated by a micrometer, etc., thereby adjusting the target position of the focus control to the prescribed optimum location to maximize the voltage held at its peak.

In the conventional apparatus, in order to accomplish he focus control of a light beam at an optimum target position, the amplitude of the reproduced signal was measured and the focus control system wa adjusted to maximize the amplitude. However, the point where the amplitude of the reproduced signal becomes a maximum varies due to the effect of noise, etc., and the vicinity of the maximum amplitude point has less variation, in the amount of reproduced signal. Therefore, it was not practically easy to find the maximum amplitude of the reproduced signal due to the limitations in the accuracy of the measurement, and it took time to make adjustments.

In addition, if any vibrations or impacts are applied externally or if the components, etc., of the optical system are deformed after, extended use, causing the light detector to move by a minute distance while the apparatus was in use, the target position of the focus control becomes incorrect and the light beam cannot be focused precisely on the recording medium. If the recorded signals are to be reproduced under such conditions, deterioration of the quality of the signals resulted, degrading the reliability of the apparatus.

SUMMERY OF THE INVENTION

An object of the present invention is to solve the problems stated above, to facilitate optimal to adjustment of the target position of the focus control and to propose a method for adjusting the target position precisely and quickly.

Another object of the present invention is to provide an apparatus which is capable of always properly focusing a light beam on the recording medium so as to record quality signals on the recording medium or to reproduce quality signals on the recording medium by detecting the condition of the focus control system and by automatically adjusting the focus control system in case any force is externally applied to the apparatus or the condition of the focus control system if changed due to extended use, etc.

In order to accomplish the above-mentioned objects, an apparatus of the present invention directs a light beam toward a recording medium, focuses the light beam thereon, moves the focusing point of the light beam in a direction almost perpendicular to the surface of the recording medium according to an out-of-focus signal which corresponds to a condition of the light beam focused on the recording medium, causes a target position of the focus control to change so that the light beam on the recording medium is focused according to a prescribed condition, stores a relation between the target position and the amplitude of a reproduced signal, and obtains an optimum target position based on such stored information, thereby adjusting the target position of the focus control.

According to the above method and composition, since it is possible to calculate the optimum target position of the focus control without obtaining a point where the reproduced signal actually becomes a maximum, it becomes possible to adjust the target position precisely and quickly, thereby accomplishing the objects described above.

BRIEF DESCRIPTION OF THE DRAWINGS

FIG: 10 is a flowchart of the processing of a microcomputer to realize the third adjusting method of the target position.

DESCRIPTION OF THE PREFERRED EMBODIMENTS

These and other objects of the invention will be described in detail by reference to the description, taken in connection with the accompanying drawings in which the same reference numbers are assigned to the same components.

Figure 1:
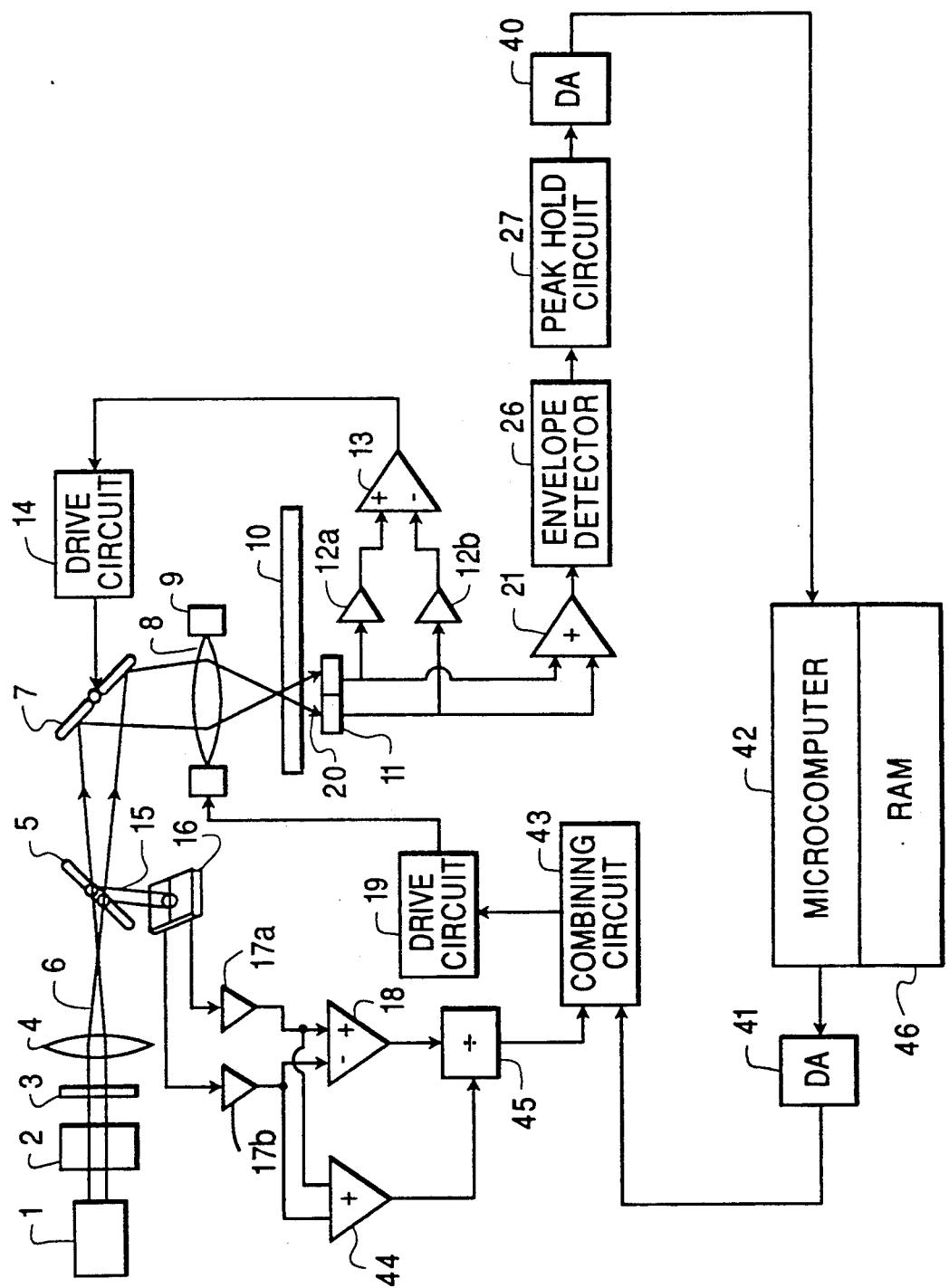
FIG. 1 is a block diagram for explaining a configuration of an embodiment of the present invention.

FIG. 1 is a block diagram for explaining a constitution of an embodiment of the present invention to automatically adjust the target position of the focus control by adapting a microcomputer.

A light generated by a light source 1 of a semiconductor laser, etc., is modulated by a light modulator 2 and is converted into a light beam 6 by a pin hole plate 3. The light beam 6 passes through an intermediate lens 4 and a semitransparent mirror 5 and is reflected by a total reflection mirror 7 which is mounted on a rotatable element. The light beam 6 reflected by the total reflection mirror 7 is focused on a recording medium 10 by a focusing lens 8. The light beam reflected from the, recording medium 10 passes through the focusing lens 8 again, is reflected by the total reflection mirror 7, thereby dividing the reflected beam by the semitransparent mirror 5 to irradiate the reflected beam on a split light detector 16 having a split construction. During the irradiation, because the light beam 6 is caused to enter the focusing lens 8 by shifting the optical axis, the position of a reflected beam 15 moves according to the vertical movement of the recording medium 10. Then, the movement of the reflected beam 15 is detected by the split light detector 16 and signals according to the quantity of light of respective split surfaces are inputted into a differential amplifier 18 through preamplifiers 17a, 17b. The signal outputted from the differential amplifier 18 is an out-of-focus signal which indicates the focusing condition of the light beam on the recording medium 10. Responding to the out-of-focus signal, the focusing lens is vertically driven by a driving element 9 to accomplish the focus control so that the light beam 6 conforms to a prescribed focusing condition when focused on the recording medium 10.

The transmission beam having transmitted the recording medium 10 is irradiated on a split light detector 11 of a split construction. From outputs of respective split surfaces of the split light detector 11, a signal which is recorded on the recording medium 10 is detected by a sum circuit 21 which obtains a sum signal of such outputs of the split surfaces. The outputs of respective split surfaces of the split light detector 11 are inputted into a differential amplifier 13 through preamplifiers 12a, 12b. The output of the differential amplifier 13 is an out-of-track signal which denotes a shifted position of the light beam from a track on the recording medium 10. The out-of-track signal is inputted into a driving circuit 14 to rotate the total reflection mirror 7 so as to accomplish the tracking control so that the light beam on the recording medium 10 scans on the track, but this operation is not directly directed to the present invention and therefore the explanation thereof is not included herein.

Figure 2A:
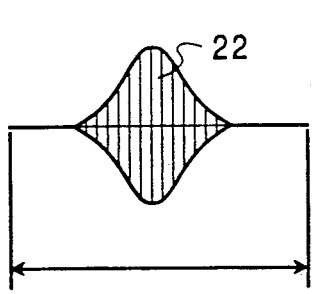
FIGS. 2A and 2B are waveform diagram of a reproduced signal for explaining a method for adjusting the target position in an embodiment.
Figure 2B:
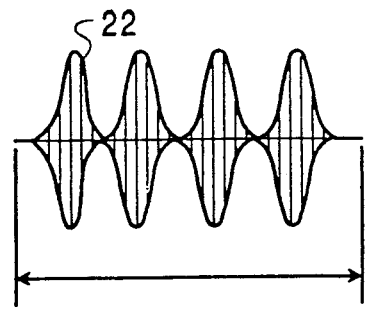

Now, a first adjusting method of the target position of the focus control by a microcomputer 42 in the FIG. 1 of the present invention will be described by referring to the accompanying FIG. 1, FIG. 2, FIG. 3 and FIG. 4. FIG. 2A is a waveform diagram showing a reproduced signal when the recording medium is free from eccentricity and FIG. 2B is a waveform diagram showing a reproduced signal when the recording medium has eccentricity. On the recording medium 10 is recorded spirally in advance a signal of specific frequency as a signal for adjustment. When the recording medium 10 caused to be rotated is irradiated by a light beam and the focus control is executed, the reproduced signal as shown in the FIG. 2 is obtained by the sum circuit 21 The abscissa of both FIG. 2A and FIG. 2B denote the time axis, T denotes one period of the rotation of the recording medium 10 and the waveform 22 denotes the reproduced signal. The reproduced signal 22 varies with the spot diameter of the light beam on the recording medium, and when the light beam is in focus, that is, when the light beam is controlled to focus optimally, the spot diameter becomes the smallest and the amplitude of the reproduced signal 22 becomes the largest. If the recording medium 10 is free from eccentricity, the recording track is traversed once per rotation and the signal output as shown in FIG. 2A is obtained. If the recording medium 10 is eccentric, the recording track will be traversed many times and the signal output as shown in FIG. 2B is obtained. Whether or not the recording medium 10 is eccentric is not directly related to the adjustment of the focus control system in the apparatus of the present invention and the description thereof is omitted accordingly.

The output of the sum circuit 21 is inputted into the microcomputer 42 through an envelope detection circuit 26, a peak hold circuit 27, and an AD converter 40. The microcomputer 42 detects a focusing condition of the recording medium 10 of the light beam 6 from an output of the AD converter 40 so that the target position of the focus control can be detected.

The microcomputer 42 is provided with a RAM 46 (Ramdom Access Memory) for storing the output of the AD converter, and the microcomputer 42 outputs a set adjusting data, converts the adjusted data into a prescribed voltage by a DA converter 41, and inputs the voltage into a combining circuit 43. circuit 43 applies a voltage corresponding to the adjusted data to the focus control system, moves the target position by steps at a prescribed interval, causing the focusing condition of the light beam 6 on the recording medium 10 to change. In the RAM 46 is stored, as numeric values, amplitudes of respective reproduced signals corresponding to the moved target positions. The microcomputer 42 calculates the adjusting data for moving the target position of the focus control system to an optimum position, outputs the calculation result, and controls the focusing condition of the light beam 6 on the recording medium 10 to an optimum level.

Respective signal outputs of the split light detector 16 are inputted into a sum circuit 44 through the preamplifiers 17a, 17b. The output signal of the sum circuit 44 is a signal proportionate to the total quantity of light of the light beam 6 reflected by the recording medium 10 and is inputted into a divider 45. The divider 45 is also inputted with the output signal of the differential amplifier 18, that is, the out-of-focus signal which indicates the error of the target position of the focus control system, while the divider 45 outputs a signal which is obtained by dividing the out-of-focus signal by the output signal of the sum circuit 44. Therefore, even if the quantity of light, etc., of the light source 1 is changed causing the gain of the detection system of the out-of-focus signal to vary, the output signal of the divider 45 becomes almost constant with respect to the constant out-of-focus, the microcomputer 42 outputs the same data, and when the same voltage is applied to the output signal of the divider 45 by the combining circuit 43, the travel of the target position of the focus control is always constant. Therefore, despite the gain variation of the detection system of the out-of-focus signal, the microcomputer 42 can precisely adjust the target position according to the outputted adjusted data. Because the reproduced signal which is the output signal of the sum circuit 21 is also a signal proportionate to the total quantity of light of the light beam 6, it is possible to obtain the same effect when the output signal of the sum circuit 21 or the sum signal of the output signal of the sum circuit 44 and the output signal of the sum circuit 21 is inputted into the divider 45 to perform division, instead of using the output signal of the sum circuit 44.

Figure 3:
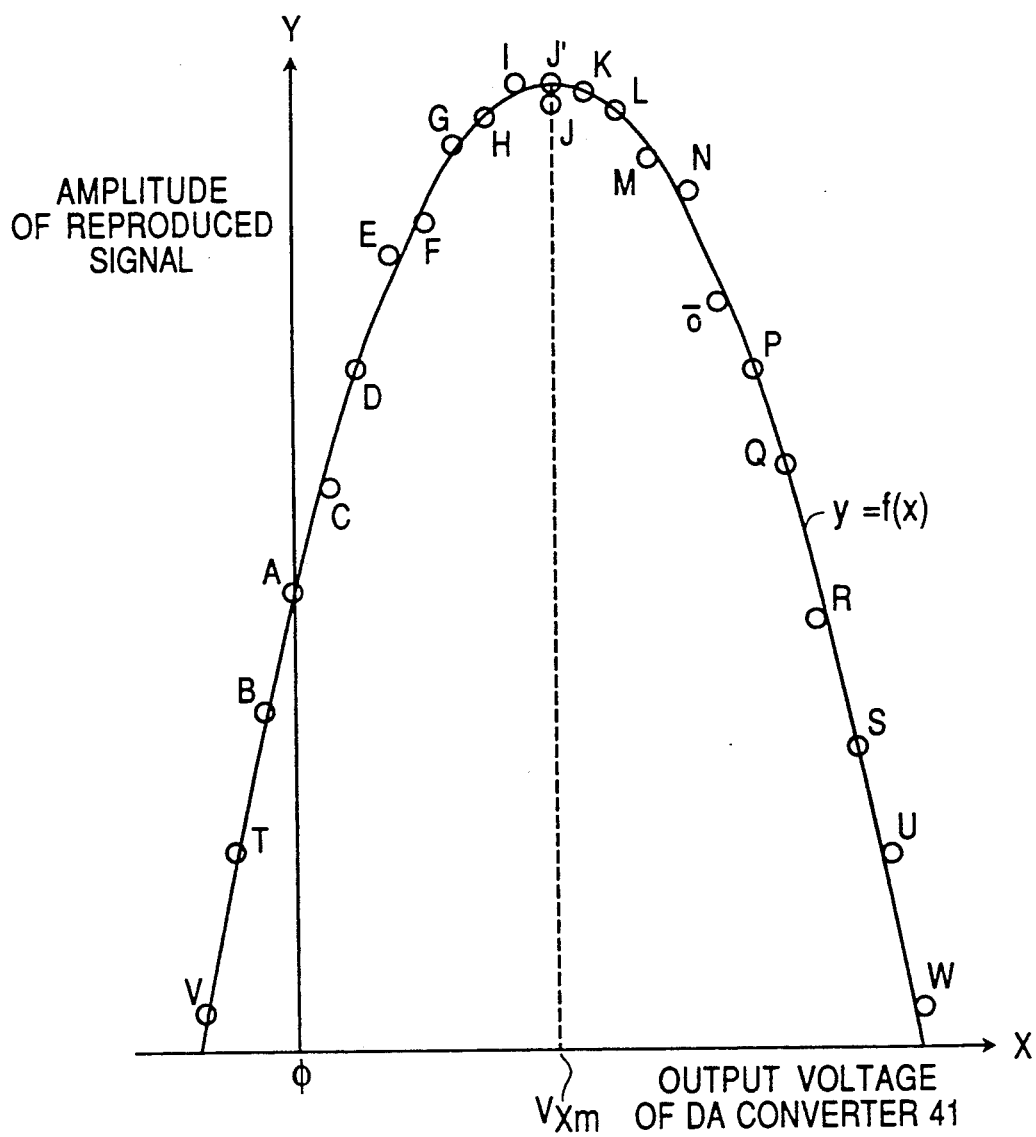
FIG. 3 is a characteristic diagram showing a relation between an output voltage of a DA converter and the maximum amplitude of adjusted reproduced signals and is for explaining operations of a first adjusting method and a second adjusting method.

FIG. 3 is a typical example of a relation (hereinafter the relation is called referred to as the reproduced signal characteristic) between the travel of the target position of the focus control according to the set adjusting data and the amplitude of the reproduced signal outputted from the peak hold circuit 27, in which the X axis denotes the vertical travel when the output voltage of the DA converter 41 (a first target position) is zero, and the Y axis denotes the output voltage of the peak hold circuit 27 (the amplitude of the reproduced signal). Further, respective target positions on the reproduced signal characteristic which shift by steps from the first target position to the optimum target position adjusted are shown in alphabetical order (in order of A, B, C, ...).

For example, it is assumed that the target position before adjustment is at the point A on the reproduced signal characteristic shown in the FIG. 3 and that the position A is shifted from the optimum position. The microcomputer 42 reads the output voltage of the peak hold circuit 27 at the point A through the AD converter 40 and stores such output voltage into the RAM 46. Then, a prescribed data is converted into a prescribed voltage by the DA converter 41 to add such voltage to the focus control system, thereby causing the target position of the light beam 6 to move to the point B. In this case, the direction toward which the target position is caused to move is a direction determined in advance and the distance the target position is caused to travel is set by the microcomputer 42. Therefore, if the target position is firstly moved, the output voltage of the peak hold circuit 27 becomes large or small depending on the position prior to starting the adjustment. (In an embodiment of the present invention, the first travelling direction is set in a direction the focusing lens 8 moves away from the recording medium 10.) The microcomputer 42 reads the output voltage of the peak hold circuit 27 at the point B through the AD converter 40, stores the read output voltage into the RAM 46, and compares the output voltage at the point B with that at the point A which was stored previously. As a result of the comparison, because the output voltage at the point B after the target position is moved is smaller than that at the point A, the microcomputer 42 sets a prescribed travel in a direction opposite to the direction in which the target position has been previously moved, and moves the target position accordingly.

The point C denotes a position after the target position has been moved twice. Likewise, the microcomputer 42 reads the output voltage of the peak hold circuit 27 at the point C through the AD converter 40, stores the read output voltage into the RAM 46. and compares it with the output voltage at the point A. As a result of the comparison, because the output voltage at the point C after moving the target position is large. the microcomputer 42 sets a prescribed travel in the same direction in which the target position has been moved previously, and moves the target position accordingly. Then, the microcomputer 42 moves the target position from the point D, point E, point F, ... point R at a prescribed interval, reads the output voltage of the peak hold circuit 27 at each target position moved, and stores such output voltage into the RAM 46.

If the target position before starting adjustment is close to an optimum position because the target position to be moved will be toward either the positive side or the negative side of the optimum target position, the microcomputer 42 reverses the moving direction of the target position to return it into the direction of the point B again, and moves the target position to the point T after passing the point B when the output voltage of the peak hold circuit 27 which is to be stored as the target position is moved in order become smaller than the minimum output voltage stored so far (the output voltage at the point B shown in the FIG. 3), that is, when the target position has reached the point S. The microcomputer 42 reads the output voltage of the peak hold circuit 27 at the point T, stores such output voltage into the RAM 46, reverses the moving direction of the target position to return it into the direction of the point S again, moves the target position to the point U after passing the point s, and stores the output voltage of the peak hold circuit 27. In this way, the target position is moved, while changing the moving direction, to the point W at which the number of output voltages of the peak hold circuit 27 stored in the RAM 46 becomes a prescribed number of samples. Therefore, with the first adjusting method, it is possible to store the output voltages of the peak hold circuit 27 with respect to the target positions which are shifted almost equally to the positive side and the negative side from an optimum target position even if the first target position is elsewhere on the reproduced signal characteristic.

Next, the adjusting process performed after storing the prescribed number of samples of the output voltages of the peak hold circuit 27 will be described in detail.

When the number of the output voltages of the peak hold circuit 27 with respect to the target positions stored in the RAM 46 has become the prescribed number of samples, the microcomputer 42 outputs a prescribed data to approximate the relation of the travel x of the moved target position and the stored output voltage of the peak hold circuit 27, that is, the amplitude y of the reproduced signal, to a prescribed function $y = f(x)$. As shown by the solid line in FIG. 3, $f(x)$ is a quadratic function $f(x)$ which is expressed by the following:

$$f(x) = ax^2 + bx + c \qquad (a)$$

which represents a general form of the function which is originally held by the reproduced signal characteristic.

Various methods are available for approximation, and the least squares method can be used for example. From the expression of the above, the following expression holds:

$$ax^2 + bx + c - y = 0 \qquad (b)$$

but when the data is outputted from the microcomputer 42 and the travel $x_j$ of the moved target position and the stored reproduced signal output $y_j$ (provided that j is the order of storing, that is, the sampling order), are substituted on the left side of this expression (b), the solution will not be 0 due to the effect of noise or sampling error, etc., but will be as shown below.

$$ax_j^2 + bx_j + c - y_j = v_j \qquad (c)$$

in which the solution is $v_j$. If in this case the values of a, b, and c are set to minimize the total sum of squared $v_j$, $$\sum_{j=1}^{n} v_j^2$$

(n is the prescribed set number of sample)
the curve expressed by the expression (a) passes almost the average position actually measured from the point A through the point W by the envelope detection circuit 26 and the peak hold circuit 27 is shown by the solid line in FIG. 3. Therefore, it is possible to calculate the prescribed function $y = f(x)$ which approximates the relation of the moved distance x and the amplitude y of the stored reproduced signal.

Now, the microcomputer 42 stores a prescribed number of samples of the amplitude of the prescribed reproduced signal, executes the operation so that the total sum of the squared $v_j$ is minimum, obtains an approximating function $y = f(x)$, and calculates the travel or the moved distance $x_m$ which maximizes the output voltage y of the peak hold circuit 27 after approximation, that is the adjusting data m which maximizes y in the function $y = f(x)$. Afterward, the microcomputer 42 outputs the above adjusting data m, adds the voltage $V_m$ from the DA converter 41 to the focus control system through the circuit 43, moves the target position, and optimizes the focusing condition of the light beam 6 on the recording medium 10.

Figure 4:
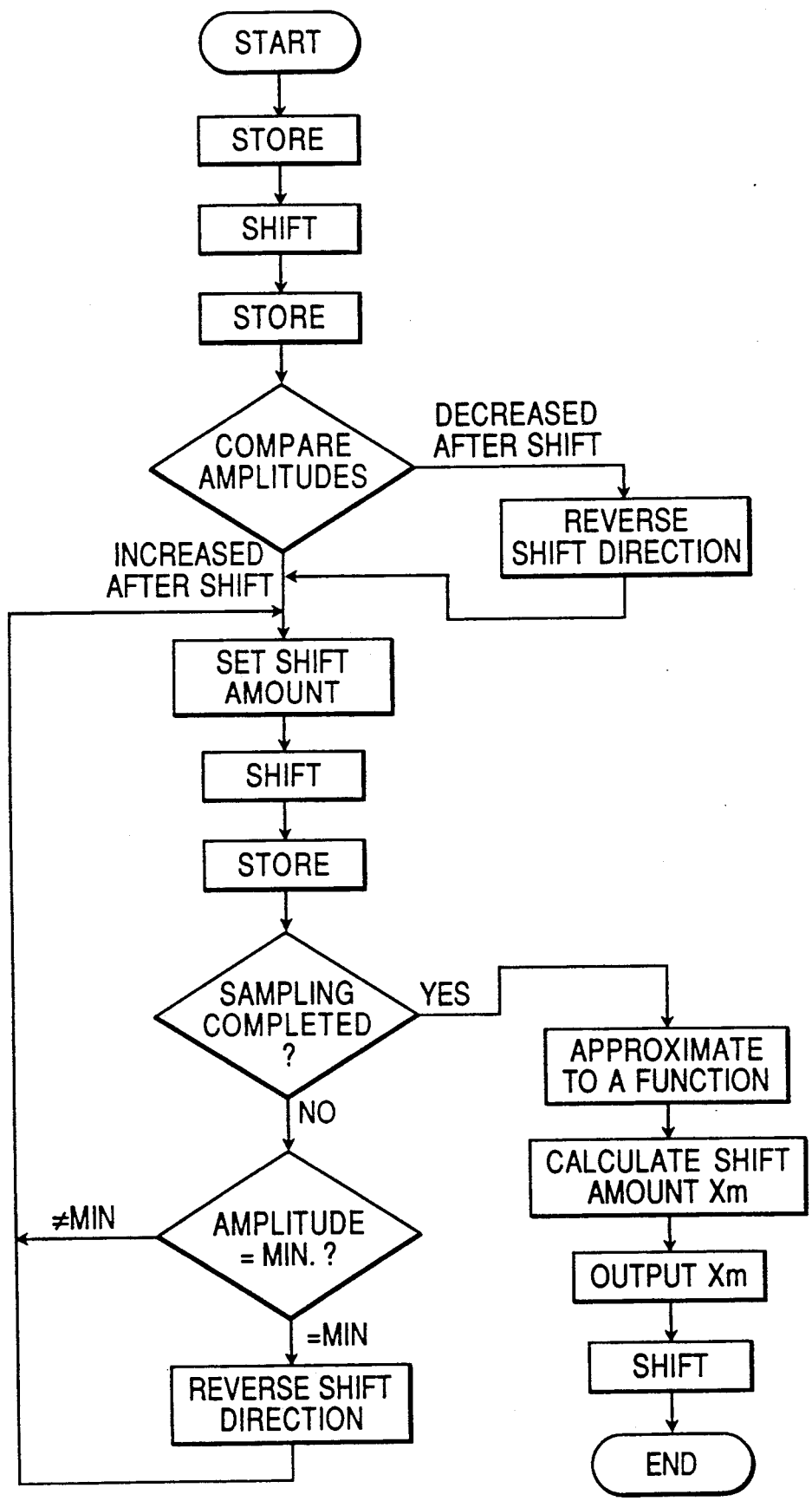
FIG. 4 is a flowchart of the processing of a microcomputer to realize the first adjusting method.

The first adjusting method of the target position by the microcomputer 42 has been described regarding an embodiment of the present invention, and the process flow in the embodiment thereof is shown in FIG. 4.

With the first adjusting method as described above, the reproduced signal characteristic is approximated to a function, the approximated function is used to obtain a point where the amplitude of the reproduced signal is maximum, and the target position of the light beam is moved to such point. However, is possible to realize the adjustment of the target position of the focus control by a second adjusting method to be explained below without obtaining the point where the amplitude of the reproduced signal is maximum. The second adjusting method will be explained by referring to FIG. 1 and FIG. 3. In the same manner as the first adjusting method, the microcomputer 42 stores the prescribed number of samples of the output voltage of the peak hold circuit 27, executes an operation to minimize the total sum of squared $v_j$, and approximates the relation between the travel x of the moved target position and the stored amplitude y of the reproduced signal to the prescribed function. With the second adjusting method, the microcomputer 42 selects a pair of two points where the amplitudes y of the reproduced signal after approximated to the function become the same, calculates the adjusting data to move the target position to a position which corresponds to the point J' that is equivalent to an intermediate point of such two points, outputs the result of calculation, and converts it into a prescribed voltage by the DA converter 41. The converted voltage is applied to the focus control system through the combining circuit to thereby optimize the focusing condition of the light beam 6 on the recording medium.

Figure 5:
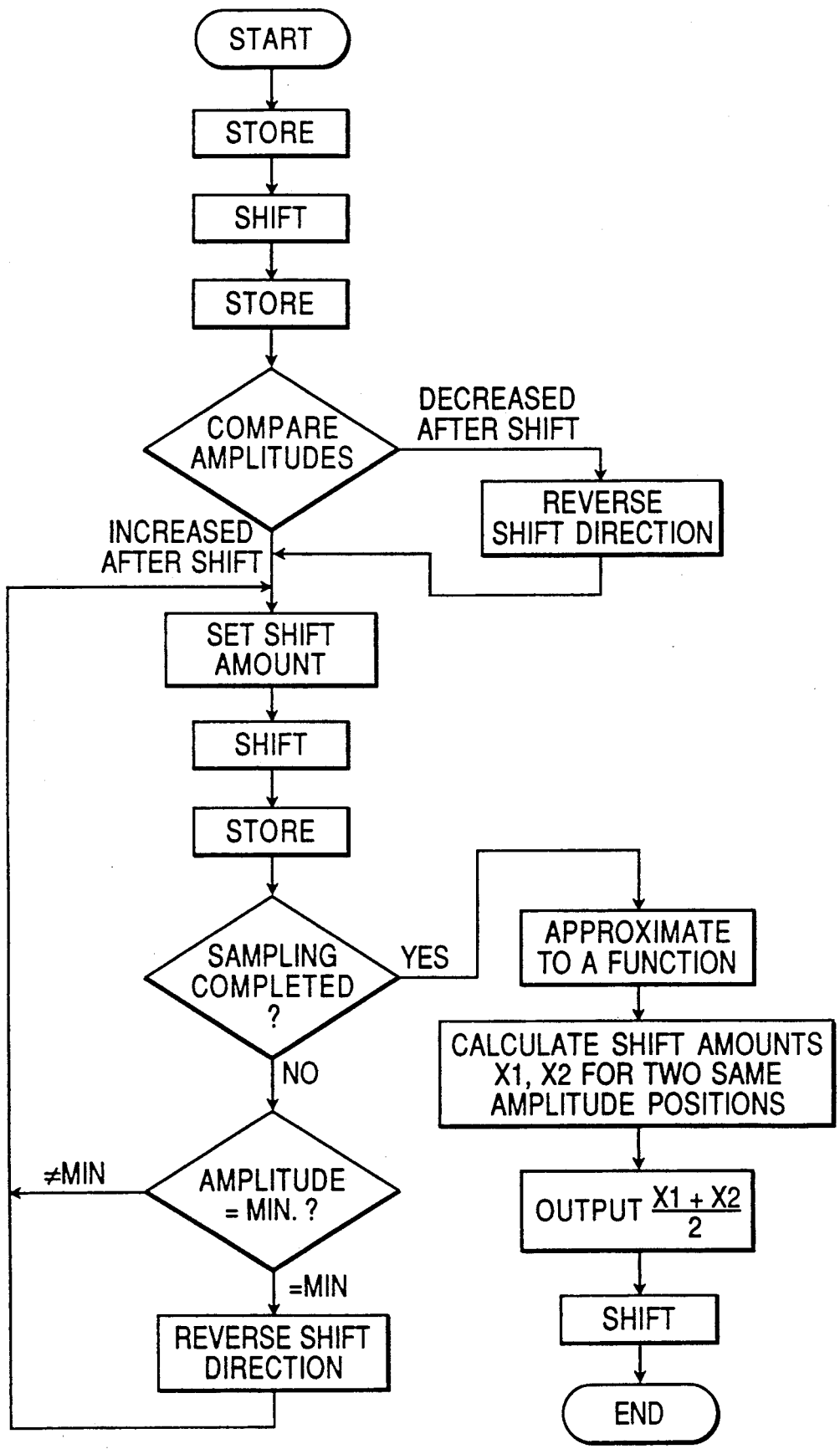
FIG. 5 is a flowchart of the processing of a microcomputer to realize the second adjusting method of the target position.

The process flow of microcomputer 42 when the second adjusting method is to be used is shown in FIG. 5.

Further, without having to store every amplitude of the reproduced signal with respect to the target position, it is possible to approximate to the prescribed quadratic function simply by storing the amplitudes of the reproduced signal of at least three points, thereby realizing the adjustment of the target position. For example, when approximating to the prescribed quadratic function of the following:

$$y = ax^2 + bx + c$$

the coefficient a, b, and c can be determined by substituting the values of x and y of three different points. Furthermore, more, by repeating these processings to obtain an average, it becomes possible to approximate the reproduced signal characteristic to the prescribed quadratic function with good accuracy. After the approximation, it is possible to realize the adjustment of the target position of the focus control by obtaining the travel x corresponding to the point where the value of y is maximum or by obtaining the travel x corresponding to the point between two points where the values of x are the same and further by moving the target position according to such value.

As stated above, the method of adjustment is explained with which the reproduced signal characteristic is approximated by the least squares method when approximating the amplitude of the stored reproduced signal to the prescribed function, but the present invention can be adapted by changing the processing to be executed by the microcomputer 42 even when the approximation method other than of least squares method is used. In addition, the present invention can also be adapted even if the function f (x) which approximates the reproduced signal characteristic is a real function other than the quadratic function of x. Further, though samples at at least three points are necessary for the approximation, the present invention is not be limited by the number of samples.

There are third, fourth, and fifth adjusting methods that are explained hereinbelow, for example, in which the adjustment of the target position of the focus control system is accomplished precisely and quickly without having to approximate the amplitude of the reproduced signal with respect to the stored travel of the target position to the prescribed function by using the composition similar to that shown in FIG. 1 and by changing the content of processing of the microcomputer 42.

In connection with the adjusting method of the target position in which the amplitude of the reproduced signal is not approximated to the prescribed function, respective adjustment operations will be explained with reference to FIG. 1 and other corresponding drawings.

In the third adjusting method, a first target position is moved toward the optimum target position step by step at prescribed intervals, while the amplitudes of the reproduced signal of respective target positions are compared to obtain two points where such amplitudes become almost the same in the vicinity of the optimum target position, and an adjusting data of the position at an intermediate point between such two points is held, whereby the target position is adjusted.

When the light beam 6 is irradiated on the recording medium 10 and focus-controlled and the signal for adjustment recorded previously on the recording medium is reproduced, the reproduced signal for adjustment is obtained from the output of the sum circuit 21 which is the sum of the output signals of the split light detector 11. The output of the sum circuit 21 is inputted into the microcomputer 42 through the envelope detection circuit 26, peak hold circuit 27, and the AD converter 40. The microcomputer 42 detects the focusing condition of the light beam 6 from the output of the AD converter 40 and identifies the target position of the focus control.

The adjusting data for optimizing the condition of the focus control is inputted by the microcomputer 42 into the combining circuit 43 after converting an adjusting data into a prescribed voltage by the DA converter 41, and the combining circuit 43 applies the prescribed voltage to the focus control system to change the focusing condition of the light beam 6 on the recording medium 10. The microcomputer 42 is capable of adjusting the target position by the adjusting data outputted.

Figure 6:
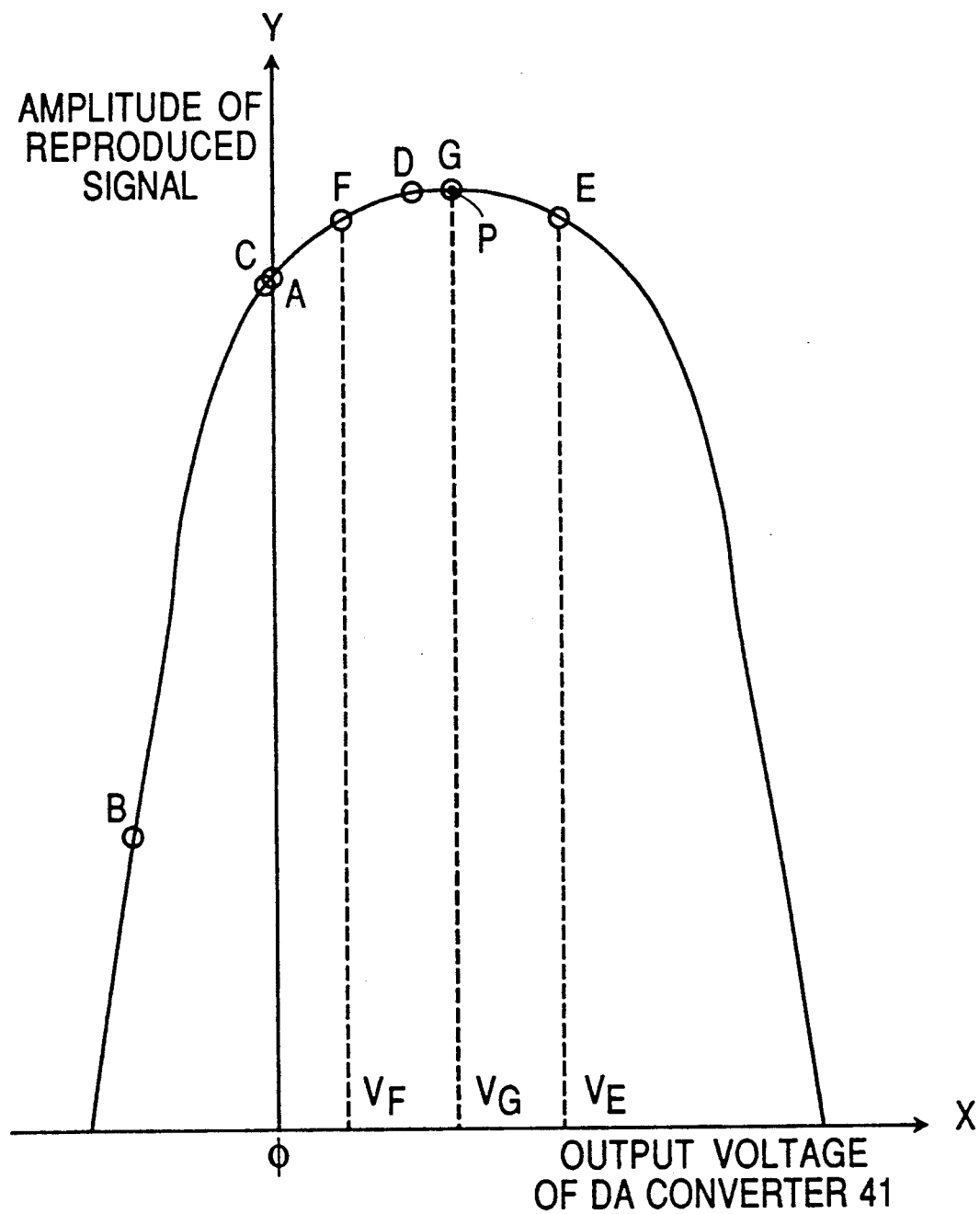
FIG. 6, FIG. 7, FIG. 8, FIG. 9 denote a characteristic diagram of a relation between an output voltage of adjusted the DA converter and the maximum amplitude of reproduced signals as adjusted for explaining an operation of a third adjusting method of the target position.

The third adjusting method of the target position by the microcomputer 42 will further be explained in detail by referring to FIG. 6, FIG. 7, FIG. 8, and FIG. 9. FIG. 6 is a diagram for explaining the operation of the third adjusting method. In the same manner as shown in FIG. 3, FIG. 6 is a standard example to illustrate a relation between the travel of the target position during adjustment and the amplitude of the reproduced signal outputted from the peak hold circuit 27, that is, a typical example of the reproduced signal characteristic, in which the X axis denotes the output voltage of the DA converter 41 and the Y axis denotes the output voltage of the peak hold circuit 27. Respective target positions on the reproduced signal characteristic which shift by steps from the first target position to the adjusted optimum target position are shown in alphabetical order (in order of A, B, C, . . . .).

For example, the target position prior to adjustment is at the point A shown in FIG. 6, which is by far shifted from the optimum position. The microcomputer 42 reads the output voltage of the peak hold circuit 27 at the point A through the AD converter 40 and stores such output voltage. Then, a prescribed adjusting data is converted into a prescribed voltage through the DA converter 41 to add the converted voltage to the focus control system, and moves the target position to the point B. In this case, the direction in which the target position is to be moved is a constant direction and the distance the target position is to be moved is set by the microcomputer 42. When the first target position is caused to move, because the output voltage of the peak hold circuit 27 becomes large and small depending on the target position prior to starting adjustment, if the reproduced signal output of the peak hold circuit 27 becomes large after the first target position is moved, the target position is moved thereafter in the same direction by the prescribed distance, and if the output voltage of the peak hold circuit 27 becomes small, the direction to move the target position is reversed and the target position is moved by the prescribed distance. The microcomputer 42 reads the output voltage of the peak hold circuit 27 at the point B through the AD converter 40 and compares the read output voltage with the output voltage at the point A which has been previously stored. As a result of the comparison, because the output voltage at the point B after the target position is moved is smaller than that at the point A, the microcomputer 42 moves the target position in the direction opposite to that the target position has previously been moved.

The point C shown in FIG. 6 denotes the target position after it has been moved twice. Likewise, the microcomputer 42 reads the output voltage of the peak hold circuit 27 at the point C through the AD converter 40 and compares the read output voltage with the output voltage at the point B which has been previously stored. As a result of the comparison, because the output voltage at the point C after the target position is moved is larger, the microcomputer 42 moves the target position into the same direction as that the target position has previously been moved.

The point D shown in FIG. 6 denotes the target position after it has been moved three times. Likewise, the microcomputer 42 reads the output voltage of the peak hold circuit 27 at the point D through the AD converter 40 and compares the read output with the output at the point C which has been previously stored. As a result of the comparison, because the output voltage at the point D after the target position is moved is larger, the microcomputer 42 moves the target position into the same direction as that the target position has previously been moved, thereby bringing the target position to an optimum position.

The point E shown in FIG. 6 denotes the target position after it has been moved four times, and the point E passes the point P where the output voltage of the peak hold circuit 27 becomes maximum, and the output voltage of the peak hold circuit 27 is reduced as compared to that at the point D. Also in this case, the microcomputer 42 reads the output voltage of the peak hold circuit 27 at the point E through the AD converter 40 and compares the read output voltage with that at the point D which has been previously stored. As a result of the comparison, because the output voltage at the point E after moving the target position is smaller, the microcomputer 42 reversely sets the moving direction, moves the target position gradually, and finds out points where the output voltages of the peak hold circuit 27 become almost the same.

The point F shown in FIG. 6 denotes the target position where the reproduced signal of the peak hold circuit 27 is almost equal to that at the point E. When the microcomputer 42 detects the point F, it outputs an intermediate value of the adjusting data outputted at the point E and the adjusting data outputted at the point F, that is, the adjusting data corresponding to the intermediate point between the point E and the point F. When outputting the adjusting data from the microcomputer, 42, it is possible with a simple processing to set the intermediate value between the two points of above because such data to be outputted from the microcomputer 42 is set in digital values.

The point G shown in FIG. 6 denotes the target position when the adjusting data corresponding to the intermediate value of the point E and the point F is outputted. Because the target position of the point G coincides with the point P where the output voltage of the peak hold circuit 27 becomes almost maximum, it is possible to optimally focus the light beam 6 on the recording medium 10 by retaining such data. In order to verify that the point G is the target position where the output voltage of the peak hold circuit 27 becomes maximum, the microcomputer 42 reads the output voltage of the peak hold circuit 27 at the point G through the AD converter 40 and compares the read output voltage with that at the point F which has been previously stored. As a result of the comparison, in case that the output at the point G is large as shown in FIG. 6, the microcomputer 42 retains the adjusting data at the point G and completes the adjustment. In case the output voltage at the point G is small, the microcomputer 42 adjusts the target position again from the point G because the point G is not an optimum position. In a case wherein the output voltage of the point G and that of the point F are equal, which case will be described in detail later, it is possible to optimally focus the light beam 6 on the recording medium 10 by detecting the section where such output voltages of such points are almost the same and further by retaining the signal which corresponds to the intermediate point of such section.

Figure 7:
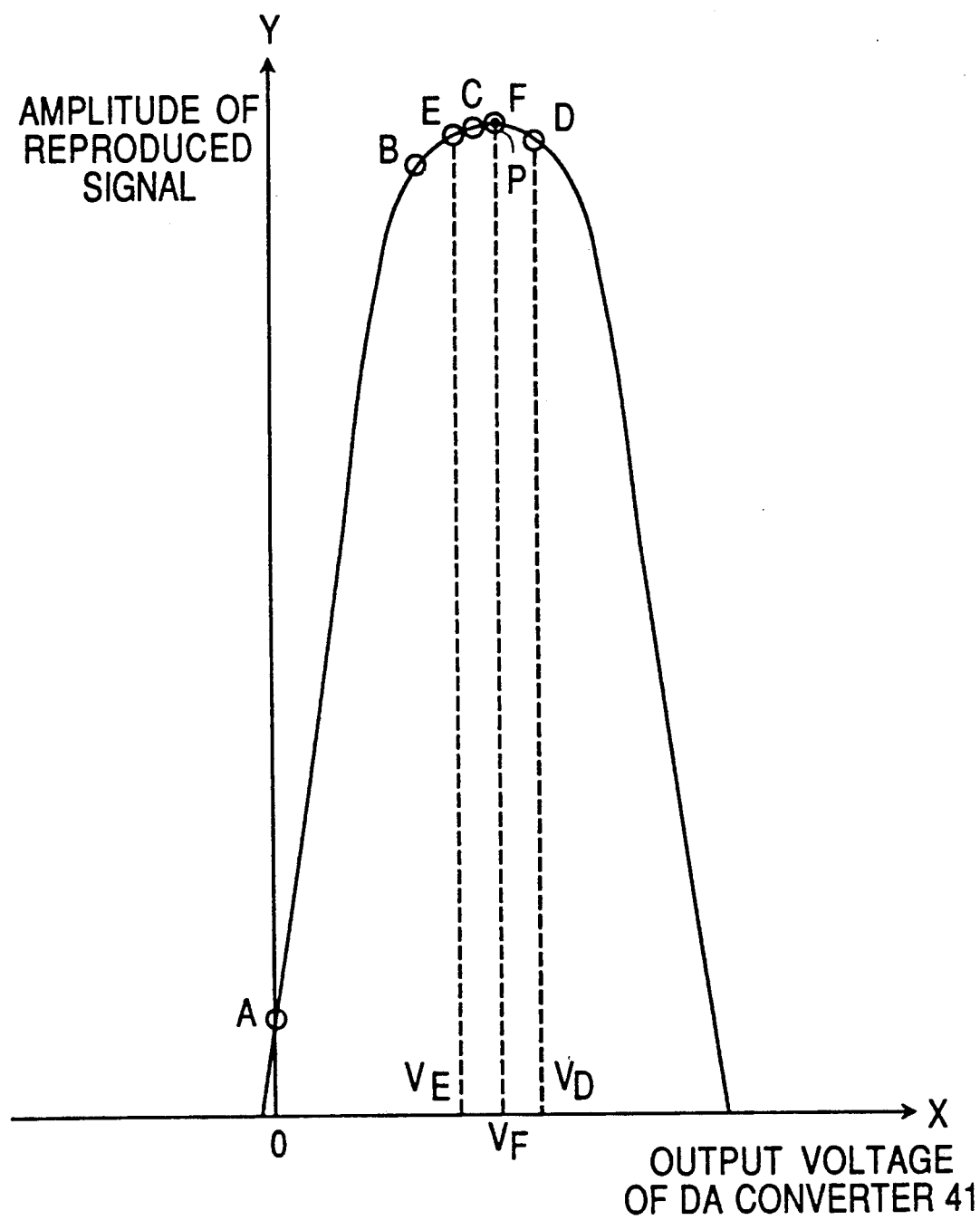
Figure 8:
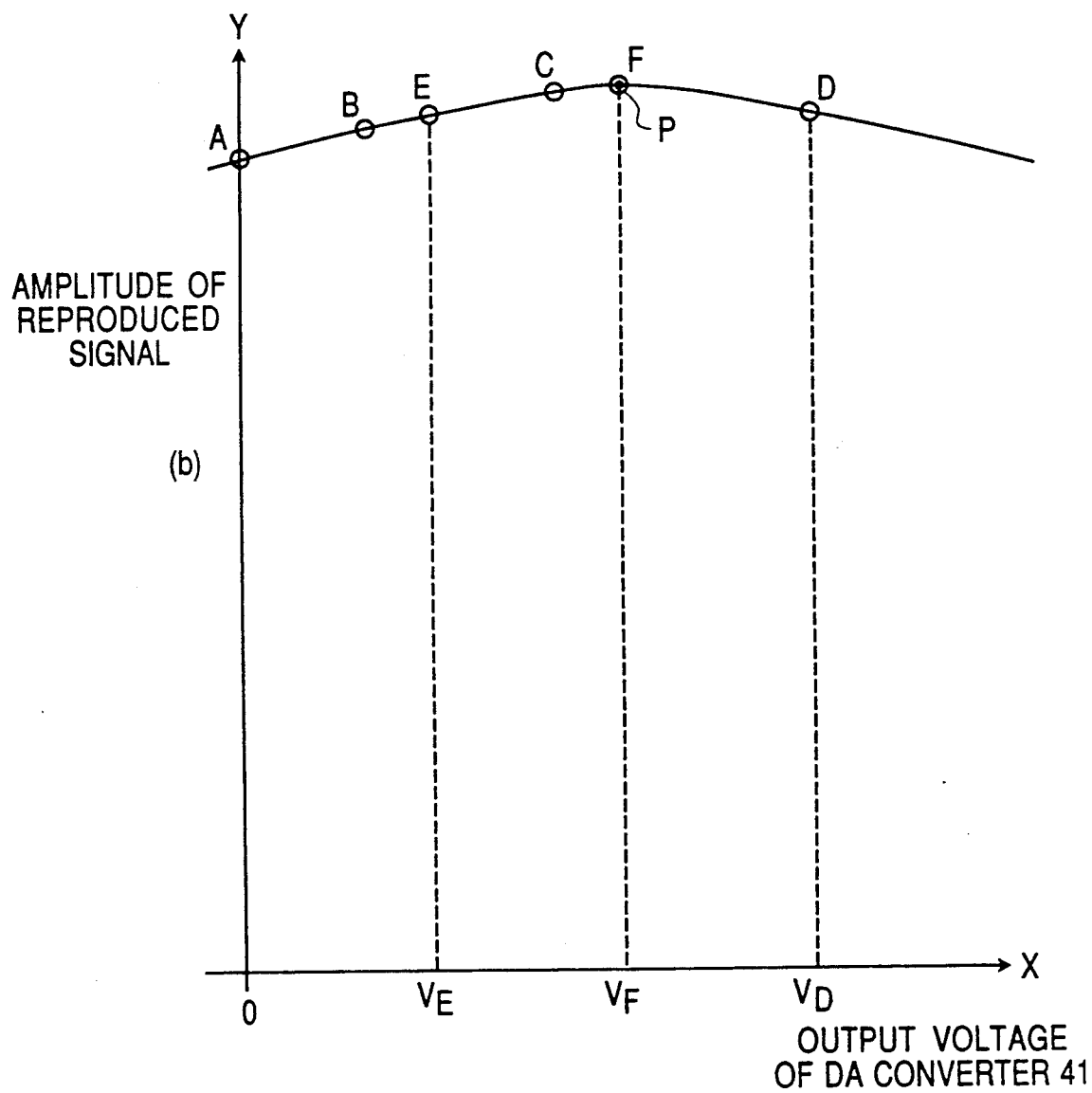

Next, the shift amount of the target position to be set by the microcomputer 42 will be explained in detail by referring to FIG. 7 and FIG. 8 in case the reproduced signal characteristic is not typical as above. FIG. 7 and FIG. 8 denote how the target position is adjusted in the diagram illustrating the reproduced signal characteristic in a manner as shown in FIG. 6, and the target positions respectively on the reproduced signal characteristic which shift by steps from the first target position to the optimum target position are shown in alphabetical order (in order of A, B, C, ... ). FIG. 7 denotes the case where the curve showing the reproduced signal characteristic is steep and FIG. 8 denotes the case where the curve showing the reproduced signal characteristic is dull.

As shown in FIG. 7, in case the curve of the reproduced signal characteristic is steep, the change in the output voltage of the peak hold circuit 27 with respect to the change of the target position is larger than a prescribed change. In such a case, the microcomputer 42 sets the output adjusting data so as to decrease the shift amount of the target position. Accordingly, it is possible to shift the target position step by step and accurately adjust the target position to reach the point P, the optimum target position.

In the case that the reproduced signal characteristic curve is dull as shown in FIG. 8, the change of the output voltage of the peak hold circuit 27 with respect to the change of the target position is smaller than the prescribed change. In such a case, the microcomputer 42 sets the output adjusting data so as to increase the shift amount of the target position. Therefore, the microcomputer 42 can move the target position largely as shown in FIG. 8, detect exactly the change in the output of the reproduced signal of the peak hold circuit 27, and can quickly adjust the target position to the point P which is the optimum target position.

For example, if the amplitude of the reproduced signal exceeds the input range of the sum circuit 21 or of the envelope detection circuit 26 or of the peak hold circuit 27 or of the AD converter 40, the vicinity of the point P, which is the maximum point of the reproduced signal amplitude to be inputted into the microcomputer 42, becomes saturated.

Figure 9:
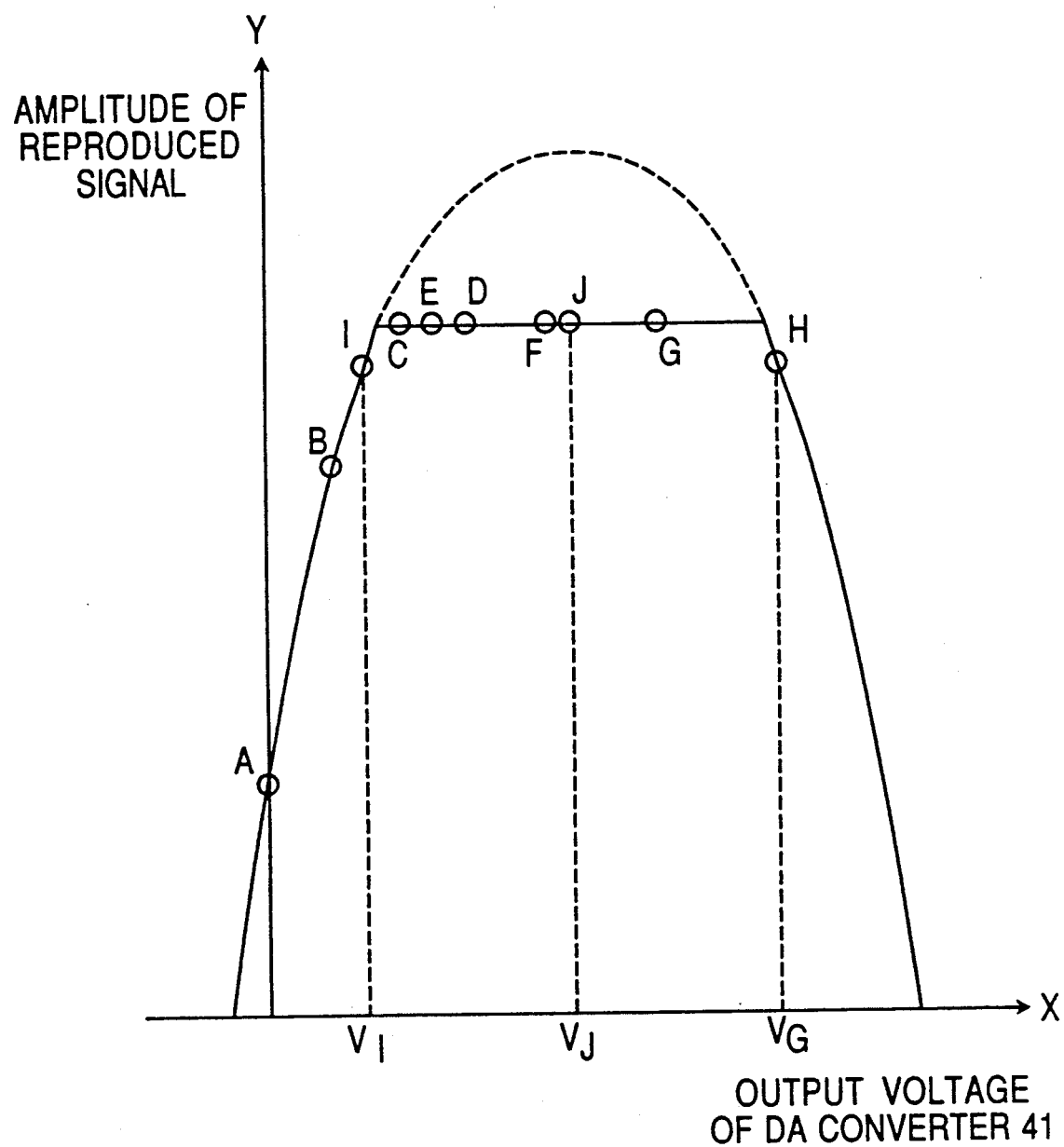

In this saturation range, even if the microcomputer 42 has moved the target position, the magnitude of the reproduced signal to be inputted will not change. FIG. 9 denotes the reproduced signal characteristic wherein the area close to the maximum point is saturated, and respective target positions shifting by steps from the first target position to the adjusted optimum target position in the same manner as shown in FIG. 6 are shown in alphabetical order. The operation for adjusting the target position of the light beam will be explained by referring to FIG. 9.

As stated above, the microcomputer 42 moves the target position in the order of the point A, point B, and point C in a direction to increase the inputted reproduced signal, and then, moves the target position to the point D to compare the point C with the amplitude of the reproduced signal. In case of the characteristic shown in FIG. 9, the amplitudes of the reproduced signal at the point C and the point D become almost equal to each other and the microcomputer 42 moves the target position to the point E which is the intermediate point between the point C and the point D. In order to verify that the point E is the optimum target position, the microcomputer 42 reads the amplitude of the reproduced signal at the point E through the AD converter 40 and compares the read amplitude with the amplitude of the reproduced signal at the point D which has been stored previously. As a result of the comparison, because the outputs of the point D and the point E are almost equal to each other, the microcomputer 42 judges that the point E is not the optimum position and adjusts the target position again from the point E. The microcomputer 42 continues to move the target position to the point F, point G, and point H until the reproduced signal is reduced, detects that the reproduced signal is reduced at the point H, reverses the moving direction of the target position, moves the target position, and finds out the point I where the reproduced signal becomes equal to that of the point H. Thereafter, the microcomputer 42 retains the adjusting data which corresponds to the intermediate position of the point H and the point I and moves the target position to the point J. In order to verify again that the point J is the optimum position, the microcomputer 42 reads the amplitude of the reproduced signal at the point J through the AD converter 40 and compares the read amplitude with the amplitude of the reproduced signal at the point I which has been previously stored. As a result of the comparison, because the output at the point J is larger than that at the point I, the microcomputer 42 retains the adjusting data at the point J and completes the adjustment. Therefore, even in the case of the reproduced signal such as above, it is possible to adjust the amplitude of the reproduced signal to an optimum position.

In case the target position of the light beam 6 is close to the optimum position from the start, the amplitude of the reproduced signal becomes smaller even if the target position of the light beam 6 is moved in either direction from the first target position. In this case, the target position moved in a prescribed direction is made a reference, the microcomputer 42 finds out in the above-mentioned procedure the point where the amplitude is almost equal to the amplitude of the reproduced signal at such reference point, and adjusts by moving the target position to the intermediate point of the two points where the reproduced signals thereof are equal to each other.

Figure 10:
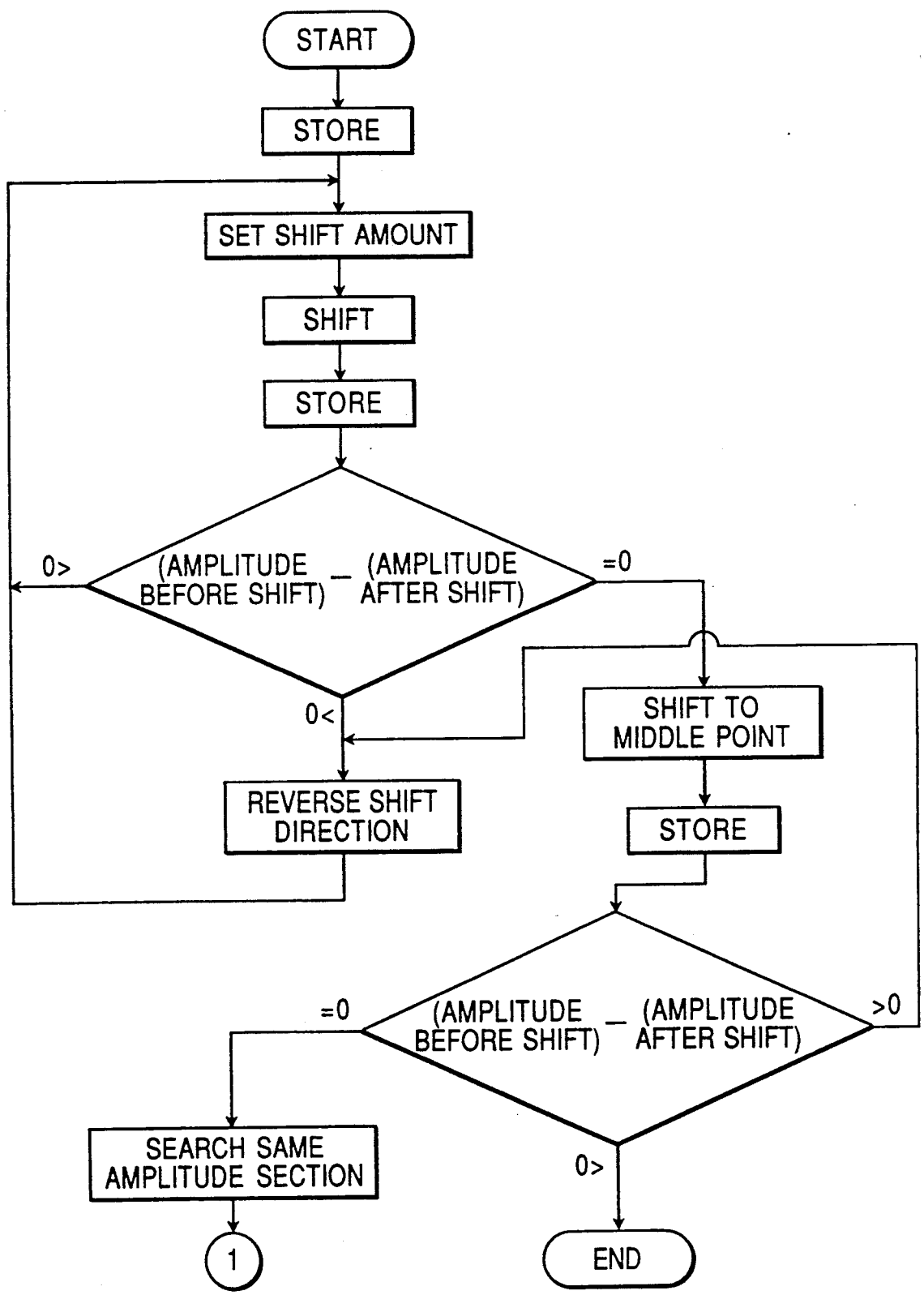

Now that the third adjusting method of the target position which is not approximate to the function of the reproduced signal characteristic has been explained, the processing flow of the third adjusting method is shown in FIG. 10.

The fourth adjusting method of the target position which does not approximate to the function through the microcomputer 42 will be explained in detail by referring to FIG. 11, FIG. 12, and FIG. 13.

In the fourth adjusting method, the microcomputer 42 moves the target position from the first target position to the optimum target position at the prescribed intervals, compares the first target position with the amplitudes of the reproduced signal at respective target positions being moved, retains a data of a target position where the amplitude thereof becomes almost equal to that of the first target position and a data of the intermediate point between such a position and the first position, and adjusts the target position of the focus control.

Figure 11:
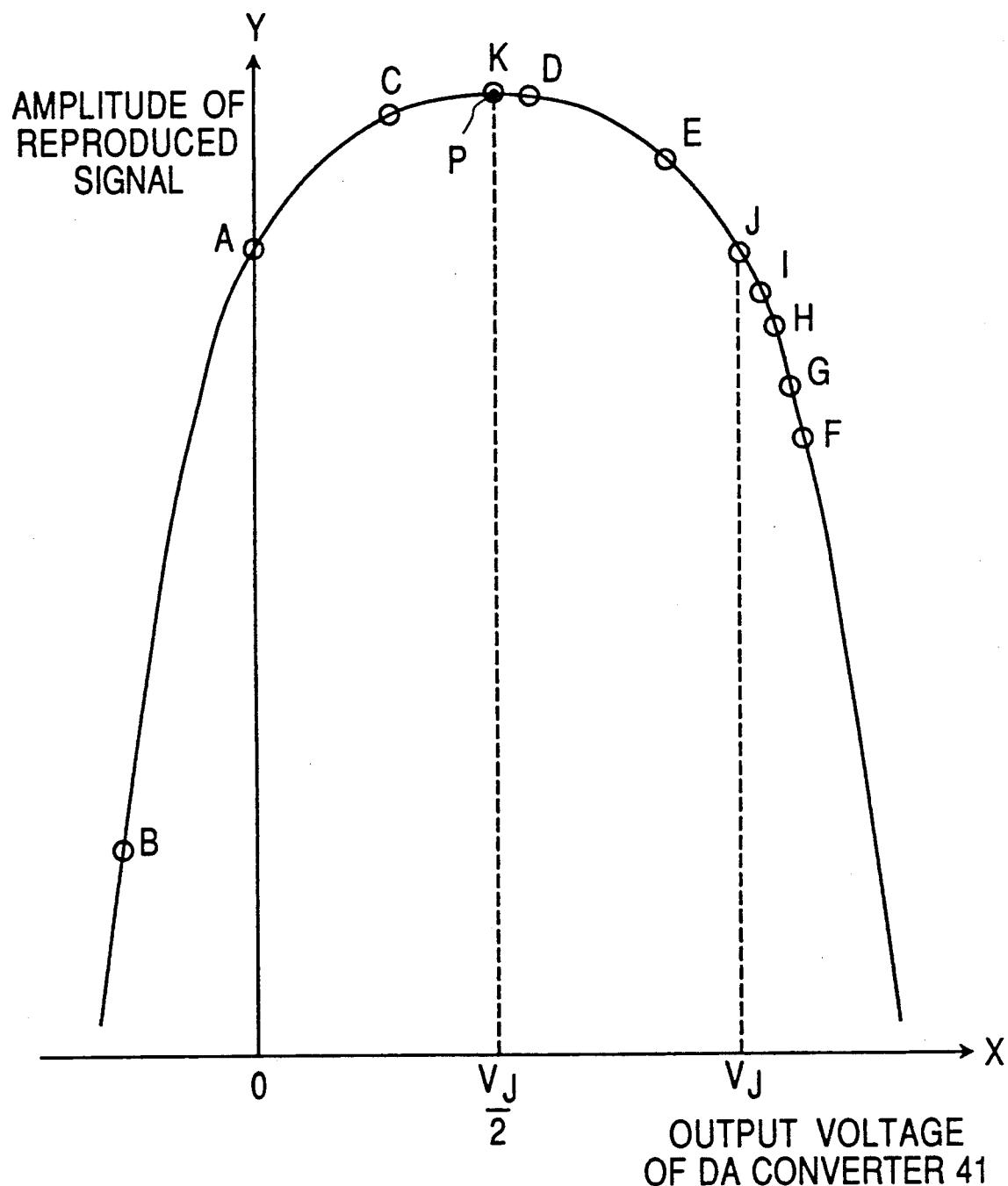
FIG. 11, FIG. 12, FIG. 13 are characteristic diagrams illustrating a relation between an output voltage of the DA converter and the maximum amplitude of adjusted reproduced signals for explaining operation of a fourth adjusting method of the target position.

FIG. 11 is a diagram for explaining the operation of the fourth adjusting method. Similar to FIG. 6, FIG. 11 shows a typical example of the relation, that is the reproduced signal characteristic of the travel of the target position during adjustment and the amplitude of the reproduced signal to be outputted from the peak hold circuit 27. In the same figure, the X axis denotes the output voltage of the DA converter 41 and the Y axis denotes the output voltage of the peak hold circuit 27. Target positions on the reproduced signal characteristic which shift by steps from the first target position to the adjusted optimum target position are shown in alphabetical order (in order of A, B, C, .....).

For example, it is assumed that the target position of the light beam 6 before adjustment is at the point A shown in FIG. 11 and that such target position is shifted from the optimum position on the recording medium 10. The microcomputer 42 reads the output voltage of the peak hold circuit 27 at the point A through the AD converter 40 and stores the output voltage. Then, the microcomputer 42 converts a prescribed adjusting data into a prescribed voltage through the DA converter 41. The converted voltage is applied to the focus control system to move the target position to the point B. During this operation, the direction for moving the target position is a previously determined direction, and the shift amount of the target position is set by the microcomputer 42. Therefore, when the target position is moved for the first time, the output voltage of the peak hold circuit 27 becomes larger or smaller depending on the target position prior to starting adjustment. Therefore, if the output voltage of the peak hold circuit 27 becomes larger when the target position has been first moved, the subsequent movement of the target position is accomplished in the same direction by the prescribed amount, and if the output voltage of the peak hold circuit 27 becomes smaller, the direction of moving the target position is reversed and the target position is moved by the prescribed amount. The microcomputer 42 reads the output voltage of the peak hold circuit 27 at the point B through the AD converter 40 and compares the read output voltage with the output voltage at the point A which has been previously stored in the microcomputer 42. As a result of the comparison, because the output voltage at the point B after the target position has been moved is smaller, the microcomputer 42 moves the target position in a direction opposite to that the target position has been first moved, by almost two times the prescribed amount.

The point C in FIG. 11 denotes the target position after it has been moved twice. The microcomputer 42 reads the output voltage of the peak hold circuit 27 at the point C through the AD converter 40 and compares the read output voltage with the output voltage at the point A which has been previously stored. As a result of the comparison, because the output voltage at the point C after the target position has been moved is larger than the output voltage at the point A, the microcomputer 42 moves the target position into the same direction as that the target position has been previously moved, by the prescribed amount.

The point D shown in FIG. 11 denotes the target position after it has been moved three times. The microcomputer 42 reads the output voltage of the peak hold circuit 27 at the point D through the AD converter 40 and compares such output voltage with the output voltage at the point A which has been stored previously. As a result of the comparison, because the output voltage at the point D after the target position has been moved is larger, the microcomputer 42 moves the target position in the same direction as that the target position has previously been moved and brings the target position to a position which is symmetrical to the first point A.

The point E shown in FIG. 11 denotes the target position after it has been moved four times. The microcomputer 42 reads the output voltage of the peak hold circuit 27 at the point E throught the AD converter 40 and compares such output voltage with the output voltage at the point A which has been previously stored. As a result of the comparison, because the output at the point E after the target position has been moved is larger, the microcomputer 42 moves the target position further in the same direction as that the target position has been previously moved and brings it close to a position which is symmetrical to the first point A.

The point F shown in FIG. 11 denotes the target position after it has been moved five times, and the target position is located at the point F where the output voltage of the peak hold circuit 27 is reduced from the output voltage at the point A. The microcomputer 42 also reads, in this case, the output voltage of the peak hold circuit 27 at the point F through the AD converter 40 and compares such output voltage with the output voltage at the point A which has been previously stored. As a result of the comparison, the output voltage at the point F after the target position has been moved is small. Then, the microcomputer 42 reverses the moving direction of the target position, moves it gradually from the point G, point H, point I, and point J, and finds out a point where the output voltage of the peak hold circuit 27 becomes almost equal to the output voltage at the point A.

The point J shown in FIG. 11 denotes the point where the output voltage of the peak hold circuit 27 is almost equal to the output voltage at the point A. When the microcomputer 42 sets the adjusting data, outputs the voltage Vj through the DA converter 41, and has detected that the output voltage of the peak hold circuit 27 at the point J is almost equal to the output voltage at the point A, then, the microcomputer 42 sets a half of the value of the adjusting data outputted at the point J, that is, the adjusting data which corresponds to the intermediate point of the point A and the point J, and outputs through the DA converter 41 the voltage Vj/2. When outputting the adjusting data from the microcomputer 42, it is possible with a simple processing to set an intermediate value of the two points stated above because the adjusting data will be set in digital values.

The point K shown in FIG. 11 denotes the target position where the adjusting data corresponding to the intermediate point of the point A and the point J, and because the target position K almost coincides with the point P where the output voltage of the peak hold circuit 27 becomes maximum, it is possible to precisely focus the light beam 6 on the recording medium by retaining this data. Further, because the point K is verified as the optimum target position by the microcomputer 42, the microcomputer 42 reads the output voltage of the peak hold circuit 27 at the point K through the AD converter 40 and compares the read output voltage with the output at the point A which has been stored previously. As a result of the comparison, if the output at the point K is larger than the output at the point A as shown in FIG. 11, the microcomputer 42 retains the adjusting data at the point K and completes the adjustment. If the output at the point K is smaller than the output at the point A, the point K is not a correct position. Then, the microcomputer 42 makes adjustments from the point K. If the output at the point K and that at the point A are equal to each other, the microcomputer 42 detects the section where such output does not vary to a large extent, and can focus the light beam 6 precisely on the recording medium 10 by retaining the signal corresponding to the intermediate point of such section.

For example. if the amplitude of the reproduced signal exceeds the input range of the sum circuit 21, or of envelope detection circuit 26, or of the peak hold circuit 27, or of the AD converter 40, the vicinity of the point P, which is the maximum point of the reproduced signal amplitude to the inputted into the microcomputer 42, becomes saturated.

In this saturation range, even if the microcomputer 42 has moved the target position, the amplitude of the reproduced signal to be inputted will not change. FIG. 12 shows a case in which the point A, which is the target position before adjustment, is outside of the saturation range and FIG. 13 shows a case in which the point A, which is the target position before adjustment, is within the saturation range. Operations for adjusting the target position of the light beam 6 will be explained in the respective cases, by referring to FIG. 12 and FIG. 13. FIG. 12 and FIG. 13 each denote the reproduced signal characteristic, in which the X axis denotes the output voltage of the DA converter 41 and the Y axis denotes the output voltage of the peak hold circuit 27. Similar to FIG. 11, the target positions of the reproduced signal characteristic, which shift by steps from the first target position to the adjusted optimum target position, are shown in alphabetical order.

Figure 12:
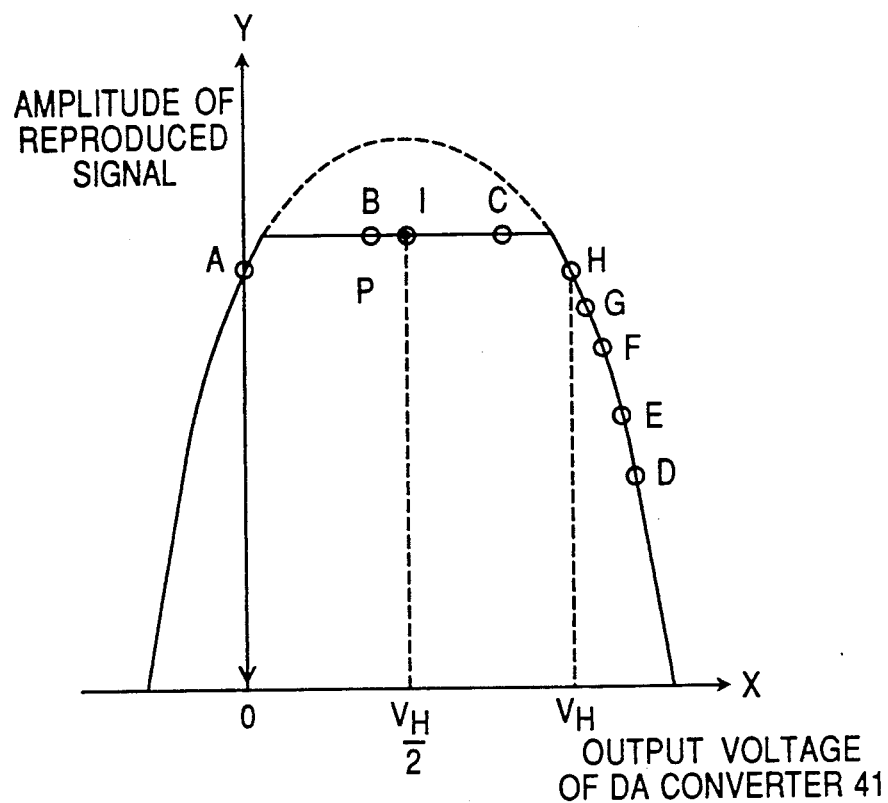

If the point A, which is the first target position before adjustment, is outside of the saturation range as shown in FIG. 12, the microcomputer 42 moves the target position in the order of the point A, point B, point C, . . . . in the increasing direction of the amplitude of the reproduced signal to be inputted. In this case, the point B and point C are in the saturation range and the amplitude of the reproduced signal does not change. However, since the amplitudes at the points B and C are larger than the amplitude at the point A, the microcomputer 42 continues to move the target position further. Then, the target position is moved to the point D by the microcomputer 42, which then compares the amplitude of the reproduced signal at the point D with that of the point A. As a result of the comparison, the output at the point D after the target position has been moved is made small. The microcomputer 42 reverse the moving direction, moves the target position gradualy from the point E, point F, point G, and to point H, and finds a point where the amplitude of the reproduced signal thereof becomes equal to that of the point A.

The point H is a point where the amplitude of the reproduced signal becomes almost equal to the amplitude of the reproduced signal at the point A Upon finding the point H, the microcomputer 42 sets a half of the value of the adjusting data outputted at the point H, that is, the adjusting data which corresponds to the point I that is the intermediate point between the point A and the point H, and outputs the voltage VH/2 through the DA converter 41. Therefore, it is possible to optimally adjust the target position in like manner as the case wherein the reproduced signal characteristic is not saturated.

Figure 13:
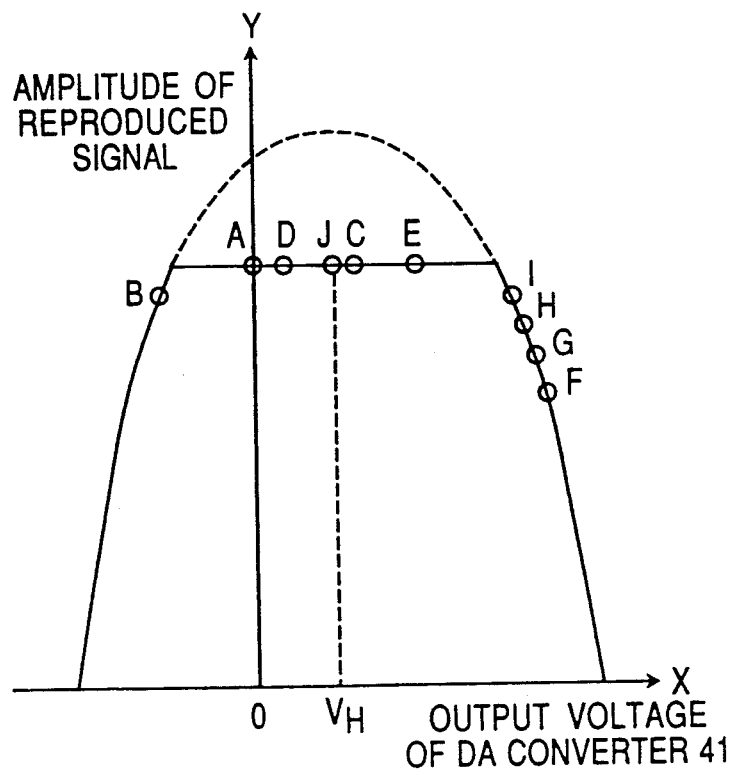

FIG. 13 denotes a case in which the point A, which is the first target position before adjustment, is within the saturation range. Also in this case, the microcomputer 42 moves the target position of the light beam 6 in the direction firstly set in advance, but whenever the first target position is located in the saturation range, the reproduced signal after moving the target position becomes equal or reduced. Therefore, the microcomputer 42 moves the target position to a position where the reproduced signal is reduced from that of the first target position A and adjusts the point of the reduced signal as a new first target position.

Therefore, the microcomputer 42 moves the target position from the point A, the first target position, in a direction which is set in advance, and because the reproduced signal at the point B after the target position has been moved is smaller than that at the point A, the microcomputer 42 sets the shift amount to almost twice and moves the target position to the point C. Because the reproduced signal at the point C is not greater than that at the point A and such are equal, the microcomputer 42 moves the target position back to the point B. Then, using the amplitude of the reproduced signal at the point B as the reference, the microcomputer 42 sets a prescribed adjusting data, detects the amplitudes of the reproduced signal in the order of the point D, point E, and point F, and moves the target position while comparing the amplitude of the reproduced signal at the point B with the amplitudes of reproduced signal at points D, E, and F.

Upon detecting at the point F that the amplitude of the reproduced signal is smaller than that at the point B, the microcomputer 42 reverses the moving direction of the target position, moves the target position gradually in the order of the point G, point H, and point I, and finds the point I where the amplitude of the reproduced signal becomes equal to that of the point B. Afterwards, the microcomputer 42 retains the adjusting data which corresponds to the point J that is the intermediate point of the point I and the point B, and focuses the light beam 6 properly on the recording medium 10. Even in such case, the microcomputer 42 can adjust the target position to the optimum position.

Figure 14:
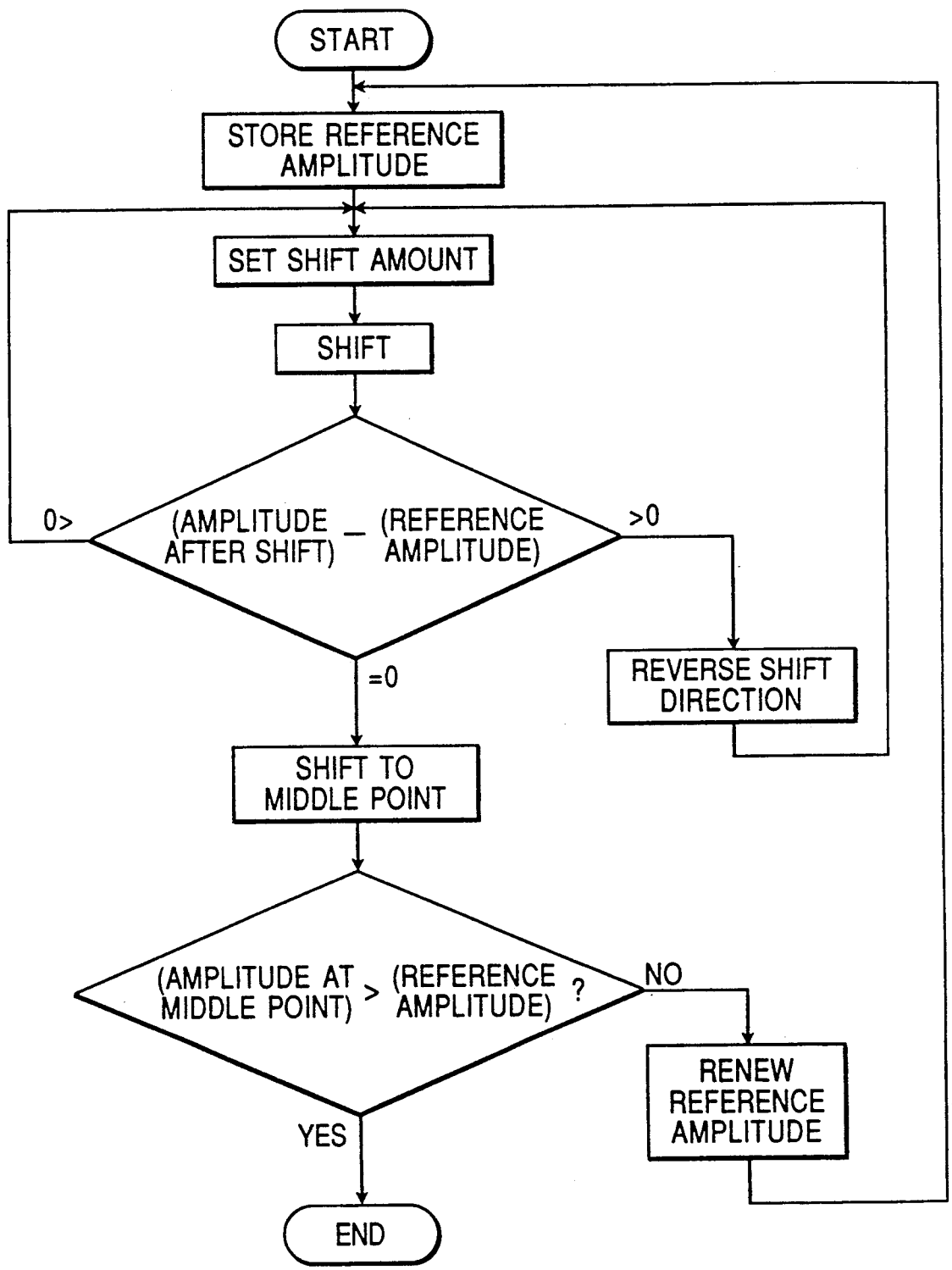
FIG. 14 is a flowchart of the processing of a microcomputer to realize the fourth adjusting method of the target position.

In case the target position of the light beam 6 is at an optimum position from the beginning, too, as with the case wherein the first target position stated above is in the saturation range, the microcomputer 42 shifts the target position once to reduce the reproduced signal, finds a point whose reproduced signal becomes equal to the reduced reproduced signal, and adjust the target position by moving it to the intermediate point of two points having equal reproduced signal amplitudes. The fourth adjusting method for the target position by the microcomputer 42 has been described above, and the processing flow thereof is shown in FIG. 14.

The fifth adjusting method of the target position which does not approximate to the function through the microcomputer 42 will be explained in detail by referring to FIG. 15, FIG. 16, and FIG. 17.

In the fifth adjusting method, the microcomputer 42 moves the target position from the first target position to the optimum target position at the prescribed intervals, shifts the target position by the same amount in both positive and negative directions at each target position being adjusted (hereinafter called the reference position), compares the amplitudes of the reproduced signal, and moves such target position to the next reference position according to the difference in the amplitude of the reproduced signal. The microcomputer 42 further retains the adjusting data at the reference position when the amplitude of the reproduced signal of the shifted target position becomes equal to the amplitude of the compared reproduced signal, and properly focuses the light beam 6 on the recording medium 10.

FIG. 15 a, b, c, d are each a typical example showing the reproduced signal characteristic, in which the X axis denotes the output voltage of the DA converter 41 and the output data of the microcomputer 42, that is, the shift amount of the target position based on the first reference position being zero, and the Y axis denotes the output voltage from the peak hold circuit 27, that is, the amplitude of the reproduced signal. On the reproduced signal characteristic shown in FIG. 15 are described the reference position and the positions shifted to the positive side and the negative side from such reference position.

Figure 15A:
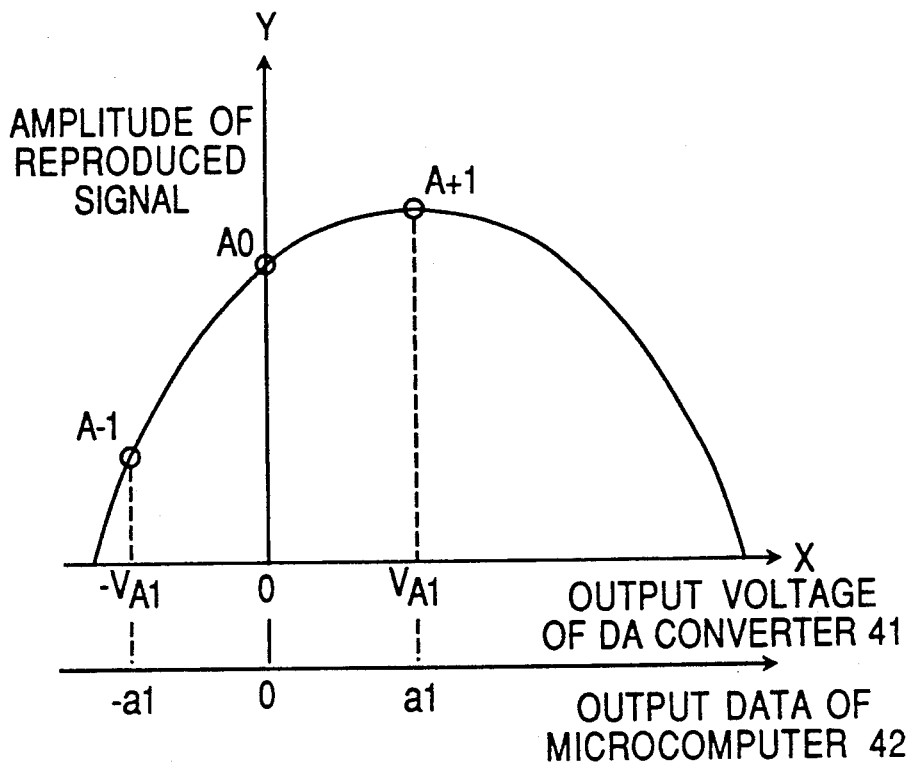
FIG. 15a-d, FIG. 16, FIG. 17 are characteristic diagrams showing a relation between an output voltage of the DA converter and the maximum amplitude of adjusted reproduced signals for explaining an operation of a fifth adjusting method of the target position.
Figure 15B:
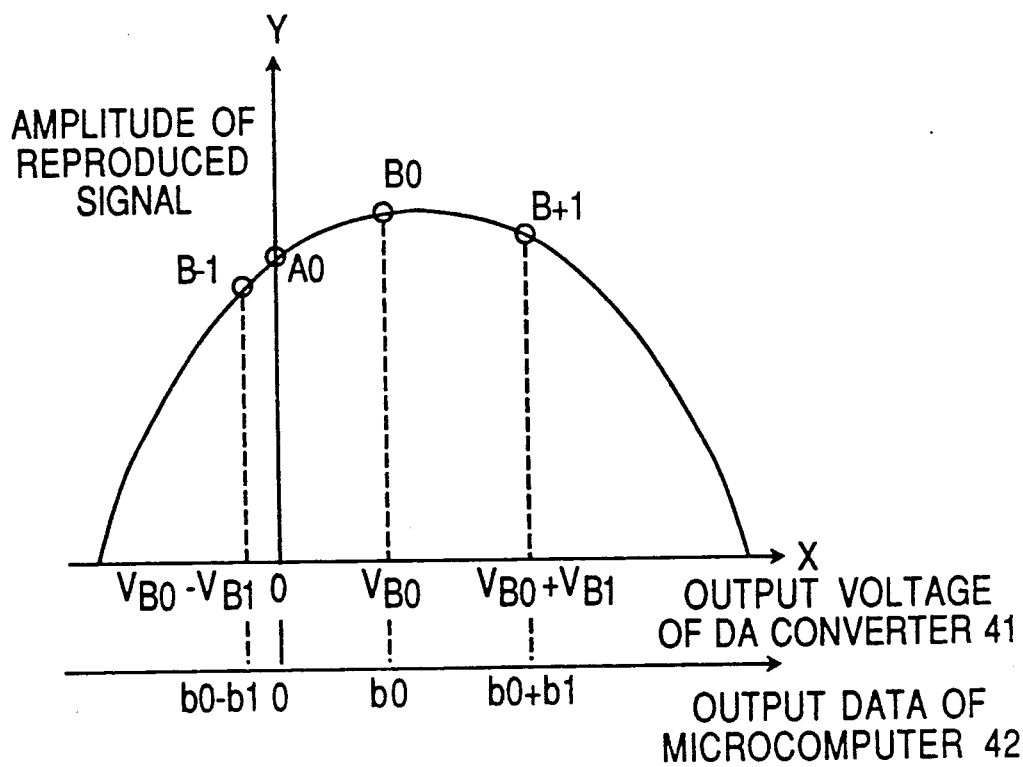

For example, it is assumed that the target position prior to adjustment is located at the point A0 shown in FIG. 15a and that such target position is shifted from the optimum position. The microcomputer 42 uses the point A0 as the first reference position, outputs a prescribed data a1, applies a voltage VA1 to the focus control system through the DA converter 41, and moves the target position from the point A0 to the point A+1. The microcomputer 42 reads the output voltage of the peak hold circuit 27 at the point A+1 through the AD converter 40 and stores it. Then, the microcomputer 42 outputs a prescribed data −a1, applies a voltage −VA1 to the focus control system through the DA converter 41, and moves the target position from the point A+1 to the point A−1. In this case, the absolute value of the difference of the outputs of the DA converter 41 at the point A0 and the point A−1 is equal to the absolute value of the difference of the output voltages of the DA converter 41. The microcomputer 42 reads also the output voltage of the peak hold circuit 27 at the point A−1 through the AD converter 40 and compares the read output voltage with the output voltage at the point A+1 which has been previously stored. The microcomputer 42 judges that the output voltage at the point A+1 is greater than that at the point A−1, applies a voltage VB0 to the focus control system through the DA converter 41, and as shown in FIG. 15b, moves the target position from the point A0, the first reference position, to the point B0, the next reference position. In this case, the direction for moving the reference position is the direction where the point A+1 has a large output voltage of the peak hold circuit 27, and the shift amount corresponds to the difference of the output voltages of the peak hold circuit 27 at the point A+1 and the point A−1 which are shifted by the same amount to the positive side and the negative side from the point A0. That is, if the difference of the output voltages of the peak hold circuit 27 shifted by the same travel to the positive side and the negative side from the reference position is greater than a prescribed amount, the microcomputer 42 increases the shift amount for the next reference position, and if the difference of the output voltages of the peak hold circuit 27 is smaller than the prescribed amount, the microcomputer 42 sets a small shift amount for the next reference position.

Then, as shown in FIG. 15b, the microcomputer 42 outputs a prescribed data b0+b1, applies a voltage VB0+VB1 to the focus control system through the DA converter 41, and moves the target position from the point B0 to the point B+1. The microcomputer 42 reads from the AD converter 40 and stores the output voltage of the peak hold circuit 27 at the point B+1.

Figure 15C:
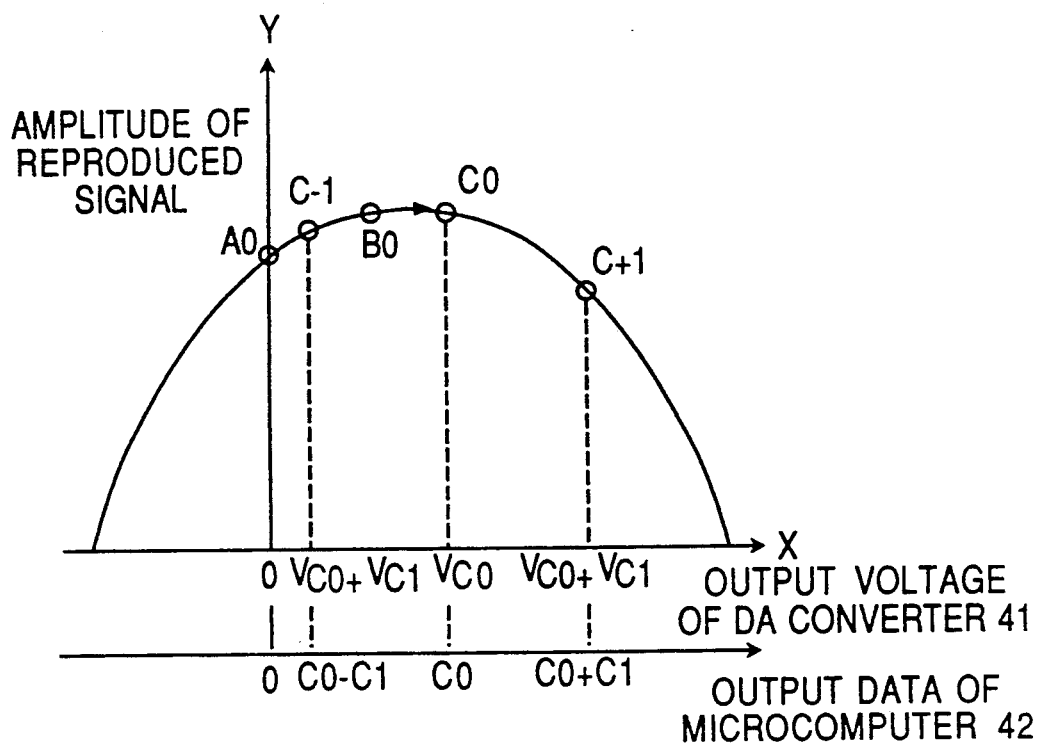

Then, the microcomputer 42 outputs a prescribed data b0−b1, applies a voltage VB0−VB1 to the focus control system through the DA converter 41, and moves the target position from the point B+1 to the point B−1. In this case, too, the absolute value of difference of the output voltages of the DA converter 41 at the point B0 and the point B−1 and the absolute value of the difference of the output voltages of the DA converter 41 at the point B0 and the point B+1 are equal to each other. The microcomputer 42 reads also from the AD converter 40 the output voltage of the peak hold circuit 27 at the point B−1, and compares the read output with the output at the point B+1 which has been previously stored. The microcomputer 42 judges that the output at the point B+1 is greater than that at the position B−1, applies a voltage VC0 to the focus control system through the DA converter 41, and as shown in FIG. 15c, moves the target position from the point B0, the reference position, to the point C0, the next reference position, by the amount which corresponds to the difference of such output voltages.

Figure 15D:
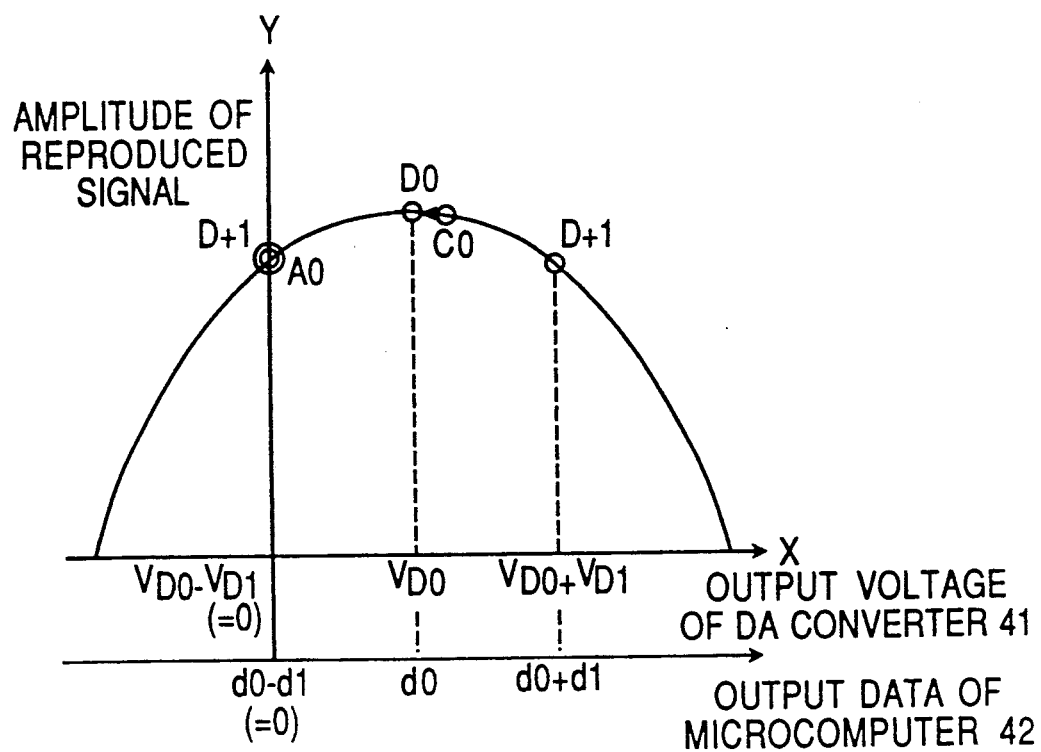

Likewise, the microcomputer 42 outputs a prescribed data c0+c1, applies a voltage VC0+VC1 to the focus control system therough the DA converter 41, and moves the target position from the point C0 to the point C+1. The microcomputer 42 reads the output voltage of the peak hold circuit 27 at the point C+1 through the AD converter 40 and stores such output voltage. Then, the microcomputer 42 outputs a prescribed data c0−c1, applies a voltage VC0−VC1 to the focus control system through the DA converter 41, and moves the target position from the point C+1 to the point C−1. In this case, too, the absolute value of the difference of the output voltages of the DA converter 41 at the point C0 and the point C−1 is equal to the absolute value of the difference of the output voltages of the DA converter 41 at the point C0 and the point C+1. The microcomputer 42 reads also in like manner the output voltage of the peak hold circuit 27 at the point C−1 through the AD converter 40 and compares such output voltage with the output voltage at the point C+1 which has been previously stored. The microcomputer 42 judges that the output at the point C−1 is greater than that at the point C+1, adds a voltage VD0 to the focus control system through the DA converter 41, and as shown in FIG. 15d, moves the target position from the point C0, the reference position, to the point D0, the next reference position, by the amount corresponding to such difference of outputs.

The point D0, the final reference position, shown on the reproduced signal characteristic almost coincides with the point where the output voltage of the peak hold circuit 27 becomes maximum, that is, the target position most suitable for the light beam 6. Therefore, at the point D0, the output voltage of the peak hold circuit 27 changes in almost equal amount even if the target position is shifted by the same amount toward the positive side and the negative side. The microcomputer 42 outputs a prescribed data d0+d1, applies a voltage VD0+VD1 to the focus control system through the DA converter 41, and moves the target position of the light beam 6 from the point D0 to the point D+1. The microcomputer 42 reads and stores the output voltage of the peak hold circuit 27 at the point D+1 through the AD converter 40. Then, the microcomputer 42 outputs a prescribed data d0−d1, applies a voltage VD0−VD1 to the focus control system through the DA converter 41, and moves the target position from the point D+1 to the point D−1. The microcomputer 42 reads the output voltage of the peak hold circuit 27 at the point D−1 in like manner through the AD converter 40, and compares the read output with the output at the point D+1 which has been stored previously. After comparing the output voltages of the peak hold circuit 27 at the point D+1 and the point D−1, the microcomputer 42 judges that the reference position D0 is the point where the output voltage of the peak hold circuit 27 becomes maximum because the output voltages at the points D+1 and D−1 are almost equal to each other and the difference of the outputs is zero, and moves the target position to an optimum position by retaining the adjusting data at the point D0.

Now, the travel of the reference position of the light beam 6 to be set by the microcomputer 42 will be described in further detail by referring to FIG. 16 and FIG. 17. FIG. 16 and FIG. 17 denote a status in which the reference position is shifted and adjusted and the result thereof is shown on the reproduced signal characteristic, and respective reference positions shifting by steps are described in alphabetical order (in order of A, B, C, . . . .) from the first target position to the adjusted optimum position. Similarly as shown in FIG. 15, the X axis denotes the output voltage of the DA converter 41 and the output data of the microcomputer 42, and the Y axis denotes the output voltage of the peak hold circuit 27, that is, the amplitude of the reproduced signal. FIG. 16 denotes a typical curve of the reproduced signal characteristic of the foregoing, FIG. 17 denotes a case wherein the amplitude of the reproduced signal exceeded the input range of the sum circuit 21, or the envelope detection circuit 26, or the peak hold circuit 27, or the AD converter 40 and the area close to the point with the maximum value of the reproduced signal characteristic is saturated.

Figure 16:
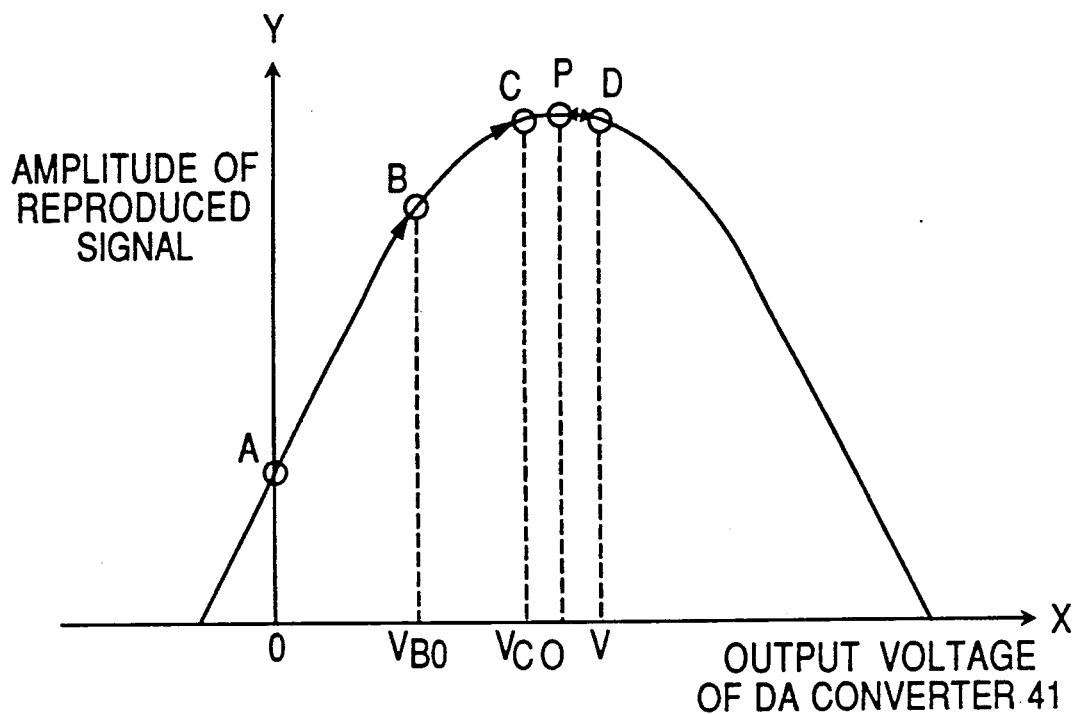

As shown in FIG. 16, if the reproduced signal characteristic is typical, i.e., the target position is not close to the optimum point P, the difference of the output voltages of the peak hold circuit 27 is large when the target position is shifted to the positive side and the negative side. Thus, the microcomputer 42 sets an adjusting data to increase the shift amount to the next reference position and moves the target position largely as shown in FIG. 16. When the reference position comes close to the correct point P, the difference of the output voltages of the peak hold circuit 27 becomes small when the target position is shifted from the reference position toward the positive side and the negative side. Therefore, the microcomputer 42 sets an adjusting data to decrease the shift amount for the next reference position and can adjust the position quickly and precisely to the point P which is the optimum position.

Figure 17:
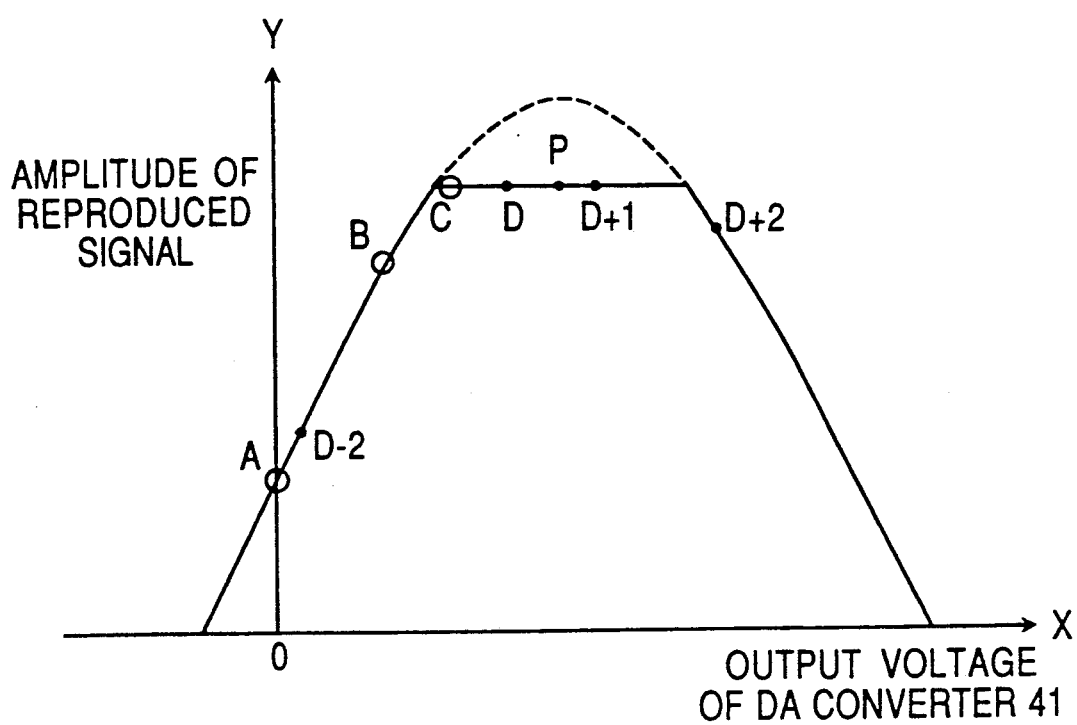

As shown in FIG. 17, in which the reproduced signal characteristic is saturated and the reference position is at the point A which is outside the saturation range, the microcomputer 42 moves the reference position largely from the point A through the point B to the point C, and thereby sets the next reference position. When the reference position is at the point D within the saturation range, the output voltage of the peak hold circuit 27 will not change even if the target position is shifted toward the point D+1. Thus, the microcomputer 42 applies a voltage VD0+VD2, moves the target position up to the point D+2, and detects the output voltage of the peak hold circuit 27. Then, the microcomputer 42 applies a voltage VD0−VD2 of the same amount and of the reverse polarity to an area around the point D of the reference position, moves the target position to the point D−2, and detects the output voltage of the peak hold circuit 27. If the reference position is moved so as to make the output voltages of the peak hold circuit 27 at the point D+2 and the point D−2 equal to each other, it is possible to adjust the position to the point P which is the optimum target position. When the fifth adjusting method is used as above, it is possible to adjust to cause the light beam 6 to be properly focused on the recording medium 10 regardless of any reproduced signal characteristic.

Figure 18:
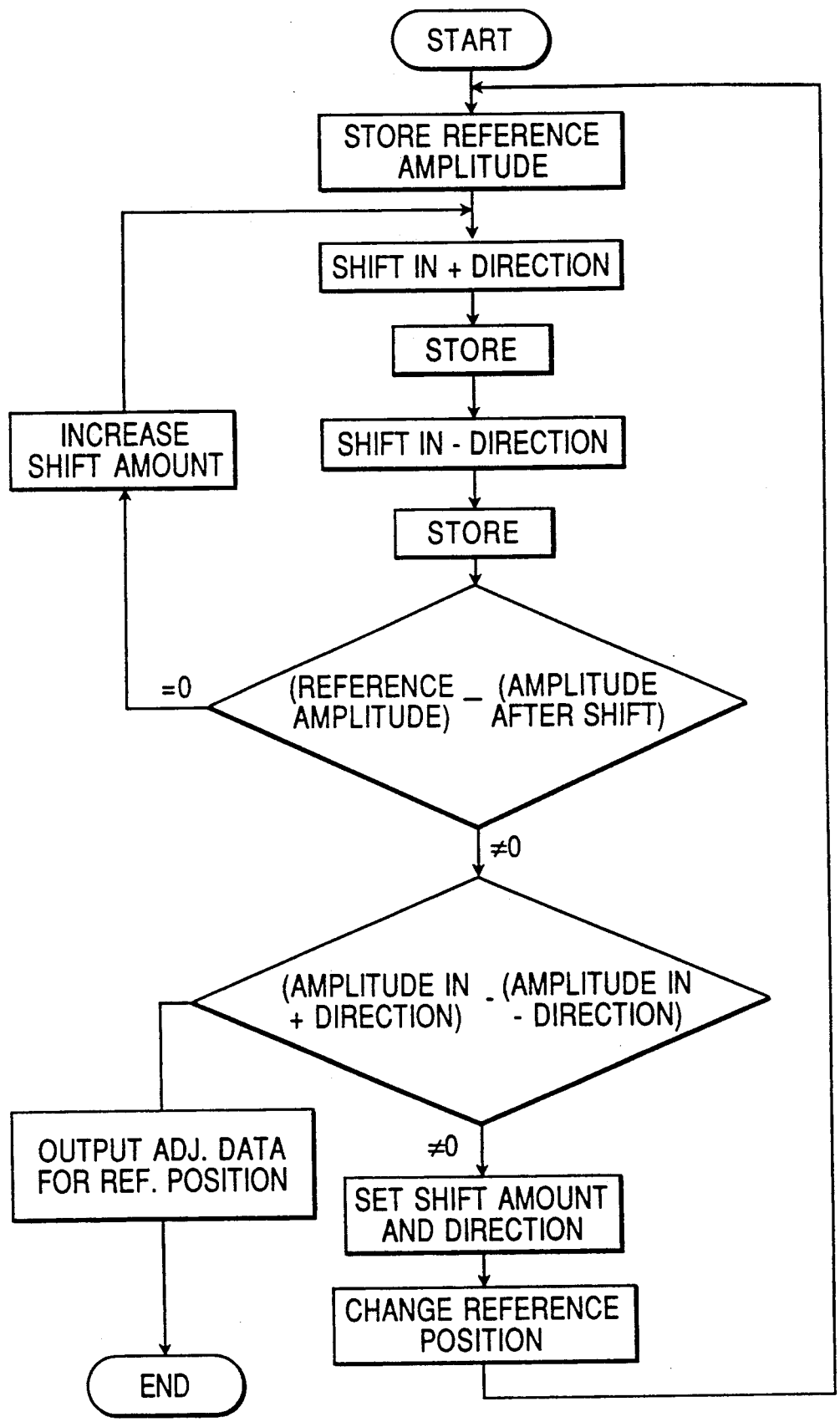
FIG. 18 is a flowchart of the processing of a microcomputer to realize the fifth adjusting method of the target position.

The fifth adjusting method of the target position by the microcomputer 42 has been described, and the flow of these processings is shown in FIG. 18.

Figure 19:
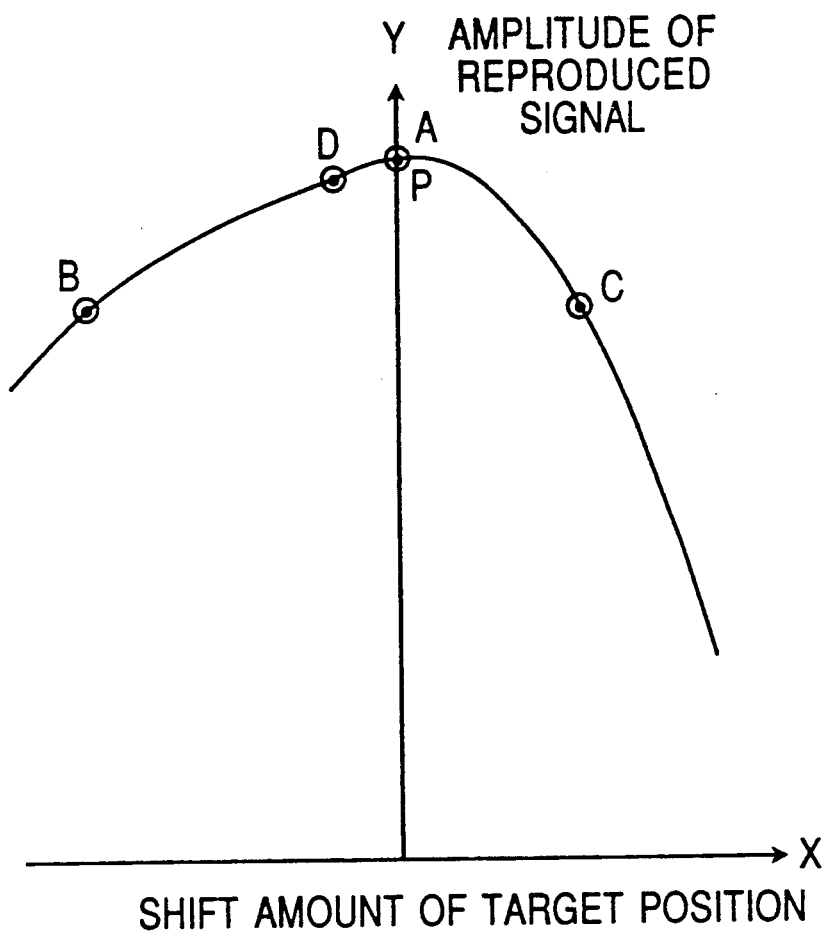
FIG. 19 is a diagram showing an asymmetrical relation between a moved distance of the light beam with respect to the recording medium and the maximum amplitude of reproduced signals so as to explain an effect obtained by the adjusting method of the present invention.

As stated above, when the reflected beam of the light beam 6 caused to enter the focusing lens 8 by shifting the optical axis is irradiated to the split light detector 16 to thereby detect the signal on the recording medium 10, the reproduced signal characteristic may not be symmetrical as shown in FIG. 19 if the abberation of the light beam is large. In such a case, if the target position is at the point A where the reproduced signal becomes maximum, the direction of the point B in FIG. 19 has a margin but the direction of the point C in FIG. 19 does not with respect to the same amount of out-of-focus. However, according to the adjusting method of the present invention, because the target position of the light beam 6 is adjusted to the point D which is the intermediate point of the point B and the point C where the reproduced signals become the same, the amount of margin for the out-of-focus becomes equal and highly reliable recording and reproducing can be accomplished even if the out-of-focus results from vibrations and shocks, etc.

When adjusting the target position in the constitution of FIG. 1, by storing shift amounts of the target position with respect to the amounts of change in the amplitude of the reproduced signal inputted to the microcomputer 42 in a ROM thereof in the form of a table, it is possible to make faster adjustment of the target position and the programming can also be simplified. Also, by averaging the amplitudes of the reproduced signal at respective target positions to be inputted into the microcomputer 42 or by averaging the adjusting data corresponding to the adjusted optimum target positions, it is possible to improve the adjusting accuracy by such average.

A timing for executing the above-described automatic adjustment of the target position will be explained. When power is supplied to the apparatus or when the recording medium 10 is replaced, the microcomputer 42 rotates the recording medium 10, drives the light source 1, and effects the focus control and tracking control, thereby effecting a ready condition for recording and reproducing (hereinafter called the stand-by condition). The automatic adjustment of the target position may be performed immediately after such stand-by condition. This makes it possible to eliminate any trouble of readjustment made by opening the outer packaging of the apparatus even when the adjusted condition may have been changed due to movement of the apparatus or change in environment.

If the time measuring function of the microcomputer 42 is used, it is possible to so program the apparatus to adjust the target position at predetermined time intervals or in a case that no recording or reproducing operation is made in a prescribed time after the stand-by condition has been made. If a temperature sensor such as a thermistor or an acceleratin sensor such as the one which employs a piezo-electric element is installed on the apparatus, it is possible to so compose the apparatus to execute the adjustment of the target position when the sensor has detected that vibration or impact has been applied to the apparatus or that the temperature inside the apparatus has been changed. Therefore, it is possible to make quick adjustment of the target position even if the adjusted condition is affected by external vibration or impact or change in temperature.

If the adjusted condition is considerably affected or shifted from the original condition, proper reproduction of signals cannot be achieved. In such a case, if a signal is inputted into the microcomputer 42 to inform that proper recording or proper reproduction was not accomplished, the target position is adjusted upon receiving such signal entered the microcomputer 42, and after the adjustment, then recording or reproduction can be carried out. If the apparatus is composed in a manner such as above, it is possible to further improve the reliability of the apparatus.

If the microcomputer 42 is used for automatic adjustment of the target position, the target position of a light beam can be properly adjusted even if a component of an optical system is deformed due to life change and the target position of the focus control system has become out of order.

Furthermore, the present invention shall not be limited in any way to the embodiments described above. In an embodiment of the present invention, an apparatus automatically adjusts the target position by means of a microcomputer. When the adjusting method of the present invention is used in manufacturing of an apparatus, precise and quick adjustment can accomplished, which in turn makes it possible to improve efficiency of manufacturing process as well as the yield. In the constitution shown in FIG. 1, the target position is adjusted by applying a signal to the focus control system but the target position adjustment can be accomplished by any other constitution. For example, when the gain of the preamplifier 17a, 17b of the constitution shown in FIG. 1 is changed, the focusing condition of the light beam 6 is changed. Therefore, if the gain of the preamplifier 17a, 17b is set so as to provide an optimum focusing condition, that is, an optimum target position with the light beam 6, it is possible to adjust the target position. If the present invention is adapted to other adjusting means for changing the focusing condition of the light beam 6, the same effect can be obtained.

In the embodiments of the present invention, a recording medium on which the signal for adjustment has been recorded previously is used, but the signal which is recorded not for the purpose of recording but for other purposes (for example, the address signal of a track or sector or a recorded information signal) may be used instead of the signal recorded for adjustment. Even if an erasable recording medium is used, the present invention can be adapted by composing an apparatus, for example, so that it repeats recording the signal for adjustment, repeats reproduction of such signal and adjusts the target position, and erases such signal after completing the adjustment. Also, if the present invention is adapted to an optical reproducing apparatus intended for reproduction only, it is possible to always obtain reproduced signal of good quality and high reliability.

What is claimed is:

1. An adjusting method for adjusting a target position of focus control, comprising the steps of:
    focusing a light beam onto a recording medium;
    moving a focusing point of the light beam in a direction almost perpendicular to a surface of the recording medium according to a reproduced signal which corresponds to a focusing condition of the light beam on the recording medium so that the target position of focus control is caused to change;

storing information of a relation between the target position and an amplitude of the reproduced signal; and calculating an optimum target position from the stored information, wherein the stored information is approximated by a prescribed function, and the optimum target position is calculated according to the prescribed function.

2. An adjusting method for adjusting a target position of focus control, comprising the steps of:

focusing a light beam onto a recording medium;

moving a focusing point of the light beam in a direction almost perpendicular to a surface of the recording medium according to a reproduced signal which corresponds to a focusing condition of the light beam on the recording medium so that the target position of focus control is caused to change to positions including two target positions where the amplitudes of the reproduced signal become almost equal to each other;

storing information of a relation between the target position and an amplitudes of the reproduced signal so as to include information of the two target positions where the amplitudes of the reproduced signal become almost equal to each other; and calculating an optimum target position from the stored information, wherein the two target positions where the amplitudes of the reproduced signal become almost equal to each other are obtained according to the stored information, and an intermediate point of the two target positions is calculated as the optimum target position.

3. An apparatus for adjusting a target position of focus control comprising:

focusing means for focusing a light beam onto a recording medium;

moving means for moving a focusing point of the light beam focused by said focusing means in a direction almost perpendicular to a surface of the recording medium;

focusing condition detecting means for generating a signal corresponding to a focusing condition of the light beam on the recording medium;

focus control means for driving said moving means according to the signal generated by said focus condition detecting means so as to control the light beam irradiated on the recording medium to conform a prescribed focusing condition;

signal detecting means for detecting a signal recorded on the recording medium by a light beam transmitted through or reflected from the recording medium;

target position changing means for changing a target position of said focus control means;

memory means for storing information of a relation between the target position changed by said focus control means and an amplitude of the signal detected by said signal detecting means; and target position adjusting means for actuating said target position changing means according to the information stored in said memory means to thereby adjust the target position of said focus control means, wherein the target position adjusting means approximates the information in said memory means to a prescribed function so as to obtain an optimum target position from said function.

4. An apparatus according to claim 3, wherein the target position adjusting means moves the target position of the focus control means in a direction in which the amplitude of the signal detected by the signal detecting means increases, and then moves the target position of the focus control means in a direction in which the amplitude of the signal detected by the signal detecting means decreases, while storing into the memory means the relation between the target position and the amplitude of the signal detected by the signal detecting means.

5. An apparatus according to claim 4, wherein if the amplitude of the signal detected by the signal detecting means does not increase when the target position is changed, the target position adjusting means once moves the target position of the focus control means in a direction in which the amplitude of the signal detected by the signal detected means decreases, and then after moving the target position of the focus control means in a direction in which the amplitude of the signal detected by the signal detecting means increases, moves the target position of the focus control means in a direction in which the amplitude of the signal detected by the signal detecting means decreases, while storing into the memory means the relation between the target position and the amplitude of the signal detected by the signal detecting means.

6. An apparatus according to claim 3, wherein the target position adjusting means moves the target position of the focus control means in a direction in which the amplitude of the signal detected by the signal detecting means increases, then moves the target position of the focus control means in a direction in which the amplitude of the signal detected by the signal detecting means decreases, and then reverses the moving direction of the target position and moves it further in the reversed direction while storing into the memory means the amplitude of the signal detected by the signal detecting means at each target position.

7. An apparatus according to claim 3, wherein the target position adjusting means obtains a point where the amplitude of the signal detected by the signal detecting means becomes almost maximum by the approximated function, and adjust the target position of the focus control means using such point as an optimum target position.

8. An apparatus according to claim 3, wherein the target position adjusting means obtains two points where the amplitudes of the signal detected by the signal detecting means becomes almost equal to each other by the approximated function, uses an intermediate position of such two points as an optimum target position, and adjusts the target position of the focus, control means.

9. An apparatus according to claim 3, wherein the target position adjusting means approximates, using a quadratic function, the relation between the target position and the amplitude of the signal detected by the signal detecting means.

10. An apparatus according to claim 9, wherein the target position adjusting means uses three points as the measuring points.

11. An apparatus for adjusting a target position of focus control comprising:

focusing means for focusing a light beam onto a recording medium;

moving means for moving a focusing point of the light beam focused by said focusing means in a direction almost perpendicular to a surface of the recording medium;

focusing condition detecting means for generating a signal corresponding to a focusing condition of the light beam on the recording medium;

focus control means for driving said moving means according to the signal generated by said focus condition detecting means so as to control the light beam irradiated on the recording medium to conform to a prescribed focusing condition;

signal detecting means for detecting a signal recorded on the recording medium by a light beam transmitted through or reflected from the recording medium;

target position changing means for changing a target position of said focus control means;

memory means for storing information of a relation between the target position changed by said focus control means and an amplitude of the signal detected by said signal detecting means; and target position adjusting means for actuating said target position changing means according to the information stored in said memory means to thereby adjust the target position of said focus control means, wherein the target position adjusting means obtains two target positions where the amplitudes of the signal detected by said signal detecting means become almost equal to each other in accordance with the information stored in said memory means and adjusts the target position of focus control to a middle point of the two target positions.

12. An apparatus according to claim 11, wherein the target position adjusting means moves the target position of the focus control means in a direction in which the amplitude of the signal detected by the signal detecting means increases, and then moves the target position of the focus control means in a direction in which the amplitude of the signal detected by the signal detecting means decreases, and wherein the target position adjusting means finds a first target position where the amplitude of the signal detected by the signal detecting means decreased first and a second target position where the amplitude becomes almost equal to that of the first target position, and adjusts the target position of the focus control means to a third target position which is a middle point of said first and second target positions.

13. An apparatus according to claim 11, wherein the target position adjusting means moves the target position of the focus control means in a direction in which the amplitude of the signal detected by the signal detecting means increases, and then moves the target position of the focus control means in a direction in which the amplitude of the signal detected by the signal detecting means decreases, and wherein the target position adjusting means finds a first target position before being moved, finds a second target position where the amplitude of the signal detected by the signal detecting means becomes almost equal to that of the first target position, and adjusts the target position of the focus control means to a third target position which is a middle point of said first and second target positions.

14. An apparatus according to claim 11, wherein if the amplitude of the signal detected by the signal detecting means does not increase when the target position is changed, the target position adjusting means once moves the target position of the focus control means in a direction in which the amplitude of the signal detected by the signal detecting means decreases, and then after moving the target position of the focus control means in a direction in which the amplitude of the signal detected by the signal detecting means increases, moves the target position of the focus control means in a direction in which the amplitude of the signal detected by the signal detecting means decreases, and wherein the target position adjusting means finds a first target position where the amplitude of the signal detected by the signal detecting means decreased first, finds a second target position where the amplitude becomes almost equal to that of the first target position, and adjusts the target position of the focus control means to a third target position which is a middle point of said first and second target positions.

15. An apparatus according to claim 13, wherein the target position adjusting means set an arbitrary reference target position, moves the target position of the focus control means to first and second target positions which are shifted by a same prescribed shift amount in opposite directions from said reference target position, compares amplitudes of the signal detected by the signal detecting means at the first and second target positions, and if the amplitudes of the signal detected by the signal detecting means at the first and second target positions are substantially different from each other, shifts said reference target position by another prescribed shift amount toward one of the first and second target positions at which the amplitude of the signal detected by the signal detecting means is larger than the amplitude at the other, and repeats the moving of the target position of the focus control means to the first and second target positions and the comparison of said amplitudes, and if the amplitudes of the signal detected by the signal detecting means at the first and second target positions are substantially equal to each other, adjusts the target position of the focus control means to said reference target position, which is a middle point between the first and second target positions.

16. An apparatus according to claim 15, wherein the target position adjusting means changes the prescribed shift amount of the reference target position depending on a difference between the amplitudes of the signal detected by the signal detecting means at the first and second target positions such that the prescribed shift amount of the reference target position decreases when said difference decreases.

17. An apparatus according to claim 15, wherein if the amplitudes of the signal detected by the signal detecting means at the first and second target positions are substantially equal to each other and to an amplitude of the signal detected by the signal detecting means at the reference target position, the target position adjusting means increases the prescribed shift amount of the first and second target positions from the reference target position so that the amplitudes of the signal detected by the signal detecting means at the first and second target positions become substantially different from the amplitude of the signal detected by the signal detecting means at the reference target position.

* * * * *